United States Patent
Wu et al.

(10) Patent No.: US 12,238,802 B2
(45) Date of Patent: Feb. 25, 2025

(54) MANAGING MCG FAST RECOVERY

(71) Applicant: GOOGLE LLC, Mountain View, CA (US)

(72) Inventors: Chih-Hsiang Wu, Taoyuan (TW); Teming Chen, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 238 days.

(21) Appl. No.: 17/422,944

(22) PCT Filed: Sep. 29, 2020

(86) PCT No.: PCT/US2020/053217
§ 371 (c)(1),
(2) Date: Jul. 14, 2021

(87) PCT Pub. No.: WO2021/091629
PCT Pub. Date: May 14, 2021

(65) Prior Publication Data
US 2022/0124568 A1 Apr. 21, 2022

Related U.S. Application Data

(60) Provisional application No. 62/947,291, filed on Dec. 12, 2019, provisional application No. 62/932,467, filed on Nov. 7, 2019.

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0069* (2018.08); *H04W 36/0079* (2018.08);
(Continued)

(58) Field of Classification Search
CPC ......... H04W 36/0069; H04W 36/0079; H04W 36/305; H04W 74/0841; H04W 76/15; H04W 76/19; H04W 88/02
See application file for complete search history.

(56) References Cited

U.S. PATENT DOCUMENTS

2013/0070700 A1 3/2013 Chang
2014/0126545 A1 5/2014 Tamura et al.
(Continued)

FOREIGN PATENT DOCUMENTS

CN 105684491 A 6/2016
CN 109246839 A 1/2019
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", TS 36.300 V14.0.0 (Sep. 2016), pp. 105-112 (Year: 2016).*
(Continued)

*Primary Examiner* — Shah M Rahman
(74) *Attorney, Agent, or Firm* — MARSHALL, GERSTEIN & BORUN LLP

(57) ABSTRACT

A UE communicating in DC with an MN and an SN detects a master cell group (MCG) failure associated with the MN. In response to detecting the MCG failure, the UE performs an MCG recovery procedure by transmitting an MCG failure information message to the SN, receiving an MCG failure recovery message from the SN, and transmitting an MCG failure recovery complete message to the MN.

14 Claims, 29 Drawing Sheets

(51) Int. Cl.
  *H04W 36/30* (2009.01)
  *H04W 74/0833* (2024.01)
  *H04W 76/15* (2018.01)
(52) U.S. Cl.
  CPC ..... *H04W 36/305* (2018.08); *H04W 74/0841* (2013.01); *H04W 76/15* (2018.02)

(56) References Cited

U.S. PATENT DOCUMENTS

| | | | |
|---|---|---|---|
| 2014/0198729 A1 | 7/2014 | Bostrom et al. | |
| 2015/0264621 A1 | 9/2015 | Sivanesan et al. | |
| 2016/0262180 A1* | 9/2016 | Rahman | H04W 74/008 |
| 2016/0316508 A1 | 10/2016 | Hong et al. | |
| 2016/0338109 A1 | 11/2016 | Rahman et al. | |
| 2018/0278357 A1* | 9/2018 | Kim | H04J 11/0076 |
| 2018/0279193 A1 | 9/2018 | Park et al. | |
| 2018/0352481 A1* | 12/2018 | Taguchi | H04W 36/0011 |
| 2019/0208560 A1 | 7/2019 | Nagasaka et al. | |
| 2019/0254042 A1 | 8/2019 | Cirik et al. | |
| 2019/0289510 A1 | 9/2019 | Rugeland et al. | |
| 2020/0045594 A1* | 2/2020 | Peng | H04W 36/0033 |
| 2020/0351955 A1* | 11/2020 | Jeon | H04L 5/0092 |
| 2020/0351968 A1 | 11/2020 | Yilmaz et al. | |
| 2021/0014923 A1* | 1/2021 | Palat | H04W 76/19 |
| 2021/0050904 A1* | 2/2021 | Cirik | H04W 76/11 |
| 2021/0120584 A1* | 4/2021 | Kazmi | H04W 56/0045 |
| 2021/0168889 A1* | 6/2021 | Kimba Dit Adamou | H04W 76/19 |
| 2021/0243590 A1* | 8/2021 | Jin | H04W 8/24 |
| 2021/0314826 A1* | 10/2021 | Chang | H04W 36/305 |
| 2021/0329723 A1* | 10/2021 | Teyeb | H04W 36/00698 |
| 2022/0124592 A1* | 4/2022 | Takahashi | H04W 76/19 |
| 2022/0201574 A1* | 6/2022 | Tsuboi | H04W 76/19 |
| 2022/0279586 A1* | 9/2022 | Tsuboi | H04W 74/0833 |
| 2022/0322174 A1* | 10/2022 | Da Silva | H04W 36/08 |
| 2022/0377629 A1* | 11/2022 | Rugeland | H04W 36/0079 |
| 2022/0394583 A1* | 12/2022 | Deenoo | H04W 74/0841 |
| 2023/0007553 A1* | 1/2023 | Rugeland | H04W 36/0058 |
| 2023/0040003 A1* | 2/2023 | Kim | H04W 76/18 |

FOREIGN PATENT DOCUMENTS

| | | | | |
|---|---|---|---|---|
| EP | 3927048 A1 | * | 12/2021 | ........ H04W 36/0058 |
| JP | 2021019220 A | * | 2/2021 | |
| WO | WO-2017/163676 A1 | | 9/2017 | |
| WO | WO-2021/076502 A1 | | 4/2021 | |

OTHER PUBLICATIONS

Ericsson, "RRC Connection Re-Establishment for Handover Failure Recovery," 3GPP Draft (2019).
Huawei, "Fast MCG Link Recovery with SRB3 and Split SRB1," 3GPP Draft (2019).
International Search Report and Written Opinion for Application No. PCT/US2020/053217, dated Mar. 15, 2021.
Samsung, "Discussion on MCG Fast Recovery," 3GPP Draft (2019).
Vivo, "Running CR to 37.340 for CA/DC Enhancements," 3GPP Draft (2019).
Ericsson, Random Access in NR, 3GPP Draft (Jun. 2017).
First Examination Report for India Application No. 202147035485, dated Jul. 1, 2022.
Office Action for European Patent Application No. 20790156.2, dated Jul. 26, 2023.
Qualcomm Incorporated, Fast SN Activation in Handover to EN-DC, 3GPP Draft (Oct. 2019).
First Office Action for Chinese Application No. 202080028227.0, dated Nov. 16, 2023.
Futurewei, "Discussion on RLM & RLF reduction for conditional PSCell addition/change," 3GPP TSG-RAN WG2 Meeting #107 bis (2019).
OPPO," Discussion on RLM for LTE mobility enhancement," 3GPP TSG-RAN WG2 Meeting #107 (2019).

* cited by examiner

MANAGING MCG FAST RECOVERY

FIELD OF THE DISCLOSURE

This disclosure relates generally to wireless communications and, more particularly, to fast recovery with a master node due to integrity check failure or reconfiguration failure.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The evolution of wireless communication to fifth-generation (5G) standards and technologies provide higher data rates and greater capacity, with improved reliability and lower latency, which enhances mobile broadband services. 5G technologies also provide new classes of services for vehicular, fixed wireless broadband, and the Internet of Things (IoT). The specification of the features in the 5G air interface is defined as 5G New Radio (5G NR).

To communicate wirelessly with a network, a user equipment (UE) may establish a connection to the network via at least one node (e.g., a base station or a serving cell) that supports a fifth-generation core network (5GC). In some situations, the UE can use multi-node connectivity (e.g., dual connectivity) to connect to multiple nodes at a time. By connecting to multiple nodes, performance improvements in user throughput, mobility robustness, or load balancing can be realized. The multiple nodes can be associated with a same radio access technology (RAT) or different RATs. As an example, the UE can use multi-RAT dual connectivity (MR-DC) or new-radio dual-connectivity (NR-DC) to establish communication with two nodes (e.g., a master node (MN) and a secondary node (SN)).

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP TS 36.323) and New Radio (NR) (see TS 38.323) provides sequencing of protocol data units (PDUs) in the uplink direction (from a user equipment (UE) to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages and use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include non-access stratum (NAS) messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of either the MN or the SN, or both can be referred to as split DRBs.

3GPP specification TS 37.340 (v15.7.0) describes procedures for adding or changing an SN in dual connectivity (DC) scenarios. These procedures involve messaging (e.g., RRC signaling and preparation) between RAN nodes (e.g., base stations or components of a distributed base station) that generally causes latency, which in turn increases the probability of failure of SN addition or SN change procedures. These procedures do not involve conditions associated with the UE, and can be referred to as "immediate" SN addition and change procedures. On the other hand, according to the "conditional" SN addition procedure, the UE receives a configuration for a candidate SN (C-SN) along with a condition from a base station, and initiates a connection to the C-SN (e.g., by performing a random access procedure) only if and when the condition is satisfied.

To further enhance DC operations, the 3GPP organization also has proposed the so-called fast MCG recovery procedure. According to this procedure, when the UE operating in DC detects MCG failure, the UE notifies the SN, which in turns notifies the MN. The MN then sends a recovery message to the UE via the SN.

Certain interactions between the conditional SN addition procedure and the fast MCG recovery can cause one or both procedures to fail. As a result, the UE loses dual connectivity and, in some cases, all network connectivity.

SUMMARY

To perform fast recovery in response to detecting a master cell group (MCG) failure at the UE, the UE performs a fast MCG recovery procedure which includes transmitting an MCG failure information message to the SN which, in turn, forwards the MCG failure information message to the MN. The MN then sends an MCG failure recovery message to the SN which, in turn, forwards the MCG failure recovery message to the UE. Then the UE transmits an MCG failure recovery complete message to the MN. MCG failures may include an MCG radio link failure, a handover failure, an MCG reconfiguration with sync failure, an integrity failure on an RRC message received from the MN 104 or reconfiguration failure on an RRC message (e.g., RRC reconfiguration message) received from the MN 104.

These techniques allow the UE and the base station to prevent data transmission between the UE and the MN.SN from being interrupted by an RRC re-establishment procedure and the techniques avoid having to perform time consuming RRC reconfiguration procedures and measurement report procedures to recover in response to the MCG failure.

One example embodiment of the techniques of this disclosure is a method for failure recovery in a user equipment (UE) communicating in dual connectivity (DC) with a master node (MN) and a secondary node (SN). The method includes detecting, by a UE communicating in DC with an MN and an SN, a master cell group (MCG) failure associated with the MN. In response to detecting the MCG failure the method includes performing an MCG recovery procedure including transmitting an MCG failure information message to the SN, receiving an MCG failure recovery message from the SN, and transmitting an MCG failure recovery complete message to the MN.

Another example embodiment of the techniques of this disclosure is a method for failure recovery in a user equipment (UE) communicating in dual connectivity (DC) with a master node (MN) and a secondary node (SN). The method includes receiving, by a UE communicating in DC with an MN and an SN, a handover command from the MN including a first time value for a first timer for performing a first random access procedure with the MN and a second time value for a second timer for performing a second random access procedure with the SN, starting the first timer and the second timer, performing the first random access procedure with the MN, stopping the first timer in response to completing the second random access procedure, performing the second random access procedure with the SN, and stopping the second timer in response to completing the second random access procedure, wherein the first timer and the second timer are configured to prevent the second timer from expiring before completion of the second random access procedure.

Yet another example embodiment of the techniques of this disclosure is a method for failure recovery in a user equipment (UE) communicating in dual connectivity (DC) with a master node (MN) and a secondary node (SN). The method includes detecting, by a UE communicating in DC with an MN and an SN, a master cell group (MCG) radio link failure associated with the MN, transmitting, an MCG failure information message to the SN, receiving a Radio Resource Control (RRC) reconfiguration message from the SN, and determining whether the RRC reconfiguration message configures a cell associated with the MN for connecting with the UE. In response to determining that the RRC reconfiguration message include the cell associated with the MN, the method includes transmitting an RRC reconfiguration complete message to the MN.

Another example embodiment of these techniques is a UE including processing hardware and configured to implement the methods above.

DETAILED DESCRIPTION OF THE DRAWINGS

Figure 1:
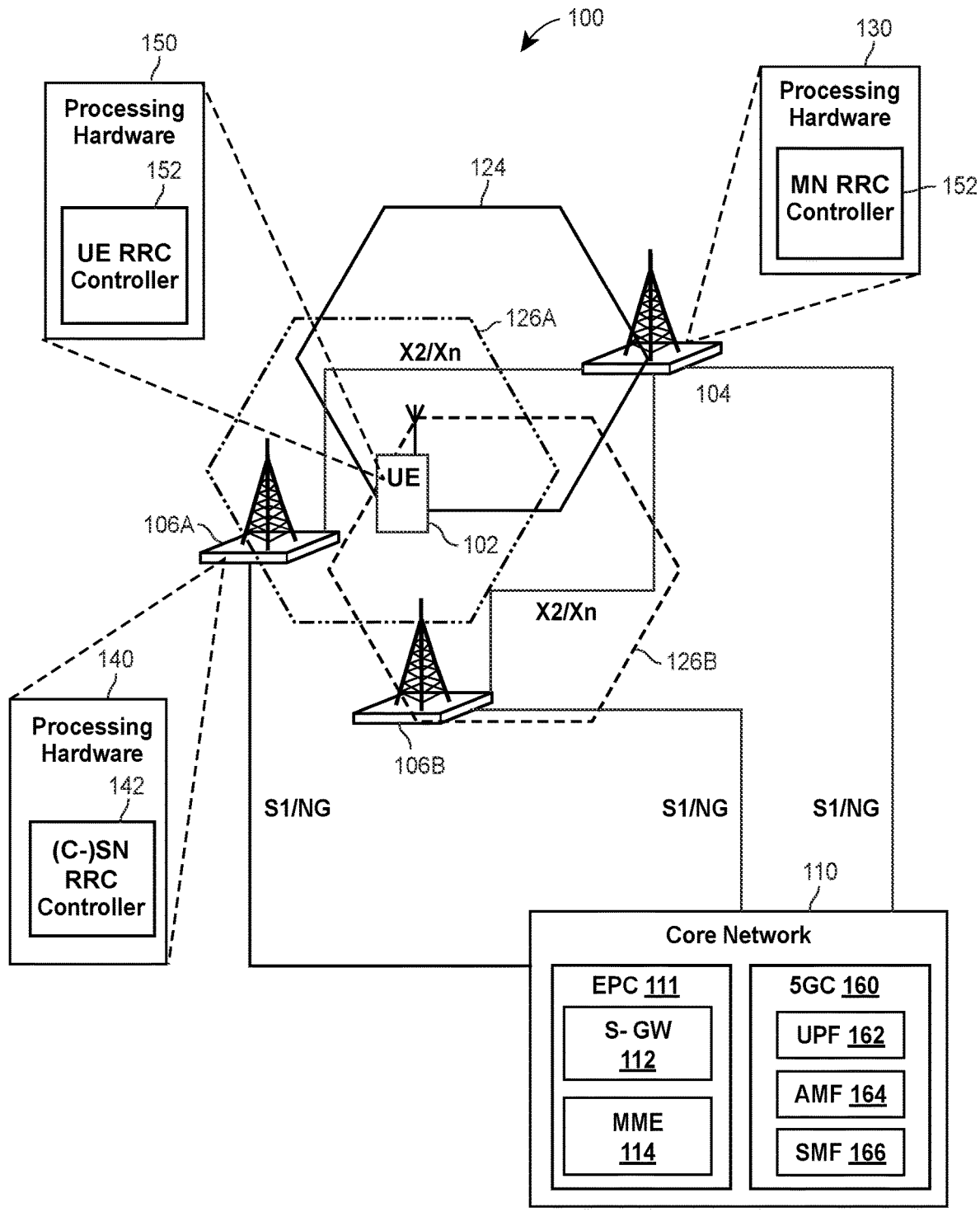
FIG. 1 is a block diagram of an example system in which a radio access network (RAN) and a user device can implement the techniques of this disclosure for managing conditional procedures related to a secondary node (SN)

FIG. 1 depicts an example wireless communication system 100 in which communication devices can implement these techniques. The wireless communication system 100 includes a UE 102, a base station 104, a base station 106A, a base station 106B and a core network (CN) 110. The UE 102 initially connects to the base station 104.

In some scenarios, the base station 104 can perform immediate SN addition to configure the UE 102 to operate in dual connectivity (DC) with the base station 104 and the base station 106A. The base stations 104 and 106A operate as an MN and an SN for the UE 102, respectively. Later on, the MN 104 can perform an immediate SN change to change the SN of the UE 102 from the base station 106A (source SN, or "S-SN") to the base station 106B (target SN, or "T-SN") while the UE 102 is in DC with the MN 104 and the S-SN 106A.

In other scenarios, the base station 104 can perform a conditional SN addition procedure to first configure the base station 106A as a candidate SN (C-SN) for the UE 102. At this time, the UE 102 can be in single connectivity (SC) with the base station 104 or in DC with the base station 104 and another base station 106B. In contrast to the immediate SN addition case discussed above, the UE 102 does not immediately attempt to connect to the C-SN 106A. In this scenario, the base station 104 again operates as an MN, but the base station 106A initially operates as a C-SN rather than an SN.

More particularly, when the UE 102 receives a configuration for the C-SN 106A, the UE 102 does not connect to the C-SN 106A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the candidate SN 106A, so that the C-SN 106A begins to operate as the SN 106A for the UE 102. Thus, while the base station 106A operates as a C-SN rather than an SN, the base station 106A is not yet connected to the UE 102, and accordingly is not yet servicing the UE 102.

In some scenarios, the condition associated with conditional SN addition can be signal strength/quality, which the UE 102 detects on a candidate primary secondary cell (PSCell) of the C-SN 106A, exceeding a certain threshold or otherwise corresponding to an acceptable measurement. For example, when the one or more measurement results the UE 102 obtains on the candidate PSCell (C-PSCell) are above a threshold configured by the MN 104 or above a pre-determined or pre-configured threshold, the UE 102 determines that the condition is satisfied. When the UE 102 determines that the signal strength/quality on C-PSCell of the C-SN 106A is sufficiently good (again, measured relative to one or more quantitative thresholds or other quantitative metrics), the UE 102 can perform a random access procedure with the C-SN 106A to connect to the candidate SN 106A. Once the UE 102 successfully completes the random access procedure, the base station 106A begins to operate as an SN, and the C-PSCell becomes a PSCell for the UE 102. The SN 106A then can start communicating data with the UE 102.

In some scenarios, the UE 102 may detect a master cell group (MCG) failure in communication with the MN 104, while the UE 102 is DC with the MN 104 and a SN (e.g., base station 106A/B). In response to the detection, the UE 102 may transmit a MCG failure indication message to the SN via radio resources of the SN (i.e., via secondary cell group (SCG) radio resources). In one implementation, the SN may forward the MCG failure indication message in an interface message (e.g., RRC Transfer message) to the MN 104 if the MN 104 comprehend the MCG failure indication message. In another implementation, the SN may indicate the MCG failure in an interface message (e.g., RRC Transfer message) and send the interface message to the MN 104 if the MN 104 does not comprehend the MCG failure indication message. In response to receiving the MCG failure indication message or the indication of the MCG failure, the MN 104 may send the UE 102 a MCG failure recovery message for recovering the MCG failure via SCG radio resources. The SN may allocate the SCG radio resources to the UE 102. For example, the SCG radio resources include one or more physical resource blocks, resource elements or subcarriers in a time unit. The time unit can be one or more ODFM symbols, slots or subframes.

In various configurations of the wireless communication system 100, the base station 104 can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104 and the base station 106A or 106B (106A/B) via the same RAT such as EUTRA or NR, or different RATs. When the base station 104 is an MeNB and the base station 106A is a SgNB, the UE 102 can be in EUTRA-NR DC (EN-DC) with the MeNB and the SgNB. In this scenario, the MeNB 104 may or may not configure the base station 106B as a C-SgNB to the UE 102. When the base station 104 is an MeNB and the base station 106A is a C-SgNB for the UE 102, the UE 102 can be in SC with the MeNB. In this scenario, the MeNB 104 may or may not configure the base station 106B as another C-SgNB to the UE 102.

In some cases, an MeNB, an SeNB or a C-SgNB is implemented as an ng-eNB rather than an eNB. When the base station 104 is an Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104 may or may not configure the base station 106B as a C-SgNB to the UE 102. When the base station 104 is an Mng-NB and the base station 106A is a C-SgNB for the UE 102, the UE 102 can be in SC with the Mng-NB. In this scenario, the Mng-eNB 104 may or may not configure the base station 106B as another C-SgNB to the UE 102.

When the base station 104 is an MgNB and the base station 106A/B is an SgNB, the UE 102 may be in NR-NR DC (NR-DC) with the MgNB and the SgNB. In this scenario, the MeNB 104 may or may not configure the base station 106B as a C-SgNB to the UE 102. When the base station 104 is an MgNB and the base station 106A is a C-SgNB for the UE 102, the UE 102 may be in SC with the MgNB. In this scenario, the MgNB 104 may or may not configure the base station 106B as another C-SgNB to the UE 102.

When the base station 104 is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104 may or may not configure the base station 106B as a C-Sng-eNB to the UE 102. When the base station 104 is an MgNB and the base station 106A is a candidate Sng-eNB (C-Sng-eNB) for the UE 102, the UE 102 may be in SC with the MgNB. In this scenario, the MgNB 104 may or may not configure the base station 106B as another C-Sng-eNB to the UE 102.

The base stations 104, 106A, and 106B can connect to the same core network (CN) 110 which can be an evolved packet core (EPC) 111 or a fifth-generation core (5GC) 160. The base station 104 can be implemented as an eNB supporting an Si interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an Si interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104, 106A, and 106B can support an X2 or Xn interface.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1, the base station 104 supports a cell 124, the base station 106A supports a cell 126A, and the base station 106B supports a cell 126B. The cells 124 and 126A can partially overlap, as can the cells 124 and 126B, so that the UE 102 can communicate in DC with the base station 104 (operating as an MN) and the base station 106A (operating as an SN) and, upon completing an SN change, with the base station 104 (operating as MN) and the SN 106B. More particularly, when the UE 102 is in DC with the base station 104 and the base station 106A, the base station 104 operates as an MeNB, a Mng-eNB or a MgNB, and the base station 106A operates as an SgNB or a Sng-eNB. when the UE 102 is in SC with the base station 104, the base station 104 operates as an MeNB, a Mng-eNB or a MgNB, and the base station 106A operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

With continued reference to FIG. 1, the base station 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an MN RRC controller 132 configured to manage or control one or more RRC configurations or RRC procedures when the base station 104 operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A.

Although FIG. 1 illustrates the RRC controllers 132 and 142 as operating in an MN and a SN, respectively, a base station generally can operate as an MN, an SN or a candidate SN in different scenarios. Thus, the MN 104, the SN 104A, and the SN 106B can implement similar sets of functions and support both MN, SN and conditional SN operations.

Still referring to FIG. 1, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE RRC controller 152 configured to manage or control one or more RRC configurations and/or RRC procedures.

In operation, the UE 102 can use a radio bearer (e.g., a DRB or an SRB) that at different times terminates at the MN 104 or the SN 106A. The UE 102 can apply one or more security keys when communicating on the radio bearer, in the uplink (from the UE 102 to a base station) and/or downlink (from a base station to the UE 102) direction.

Figure 2:
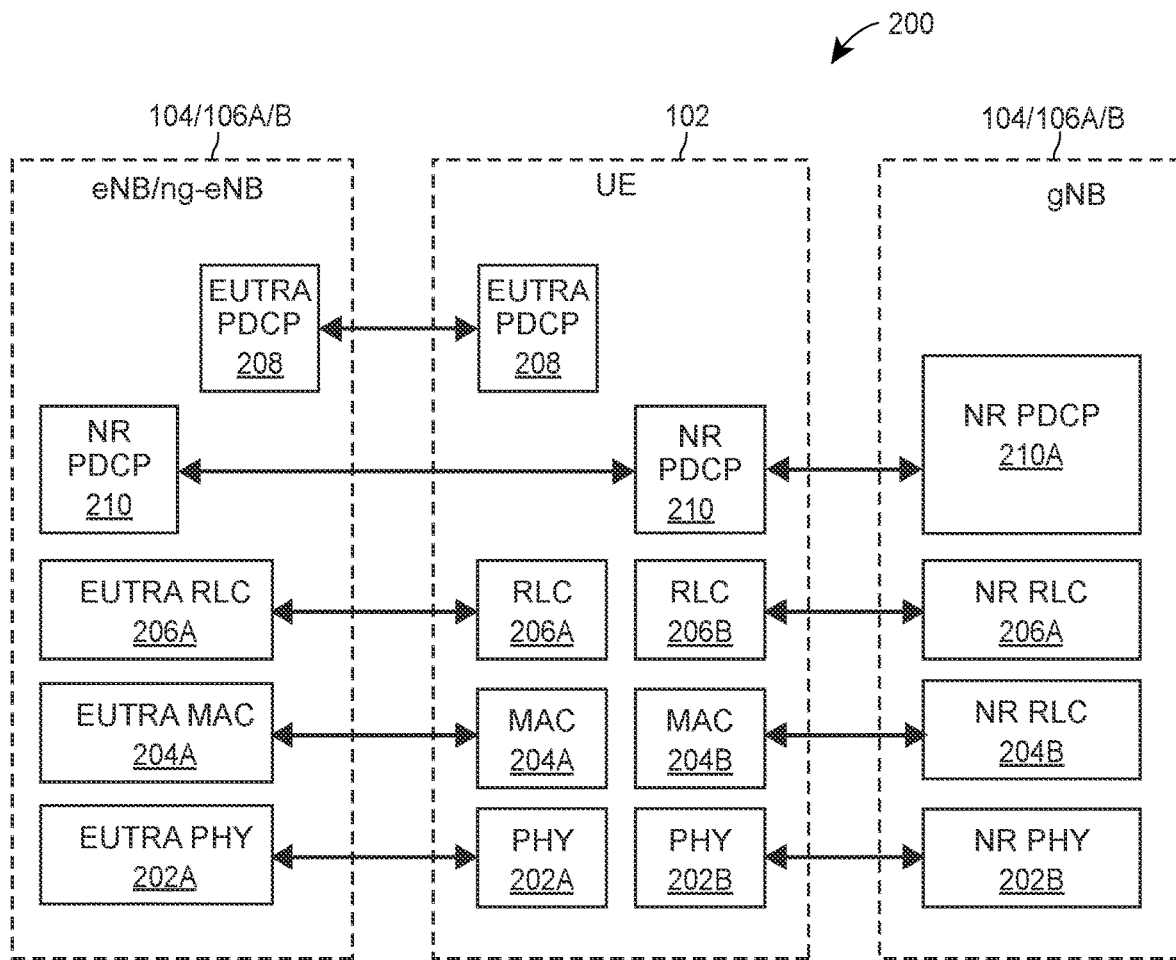
FIG. 2 is a block diagram of an example protocol stack according to which the UE of FIG. 1 communicates with base stations.

Next, FIG. 2 illustrates in a simplified manner a radio protocol stack according to which the UE 102 can communicate with an eNB/ng-eNB or a gNB. Each of the base stations 104, 106A, or 106B can be the eNB/ng-eNB or the gNB.

The physical layer (PHY) 202A of EUTRA provides transport channels to the EUTRA Medium Access Control (MAC) sublayer 204A, which in turn provides logical channels to the EUTRA Radio Link Control (RLC) sublayer 206A, and the EUTRA RLC sublayer in turn provides RLC channels to the EUTRA PDCP sublayer 208 and, in some cases, NR PDCP sublayer 210. Similarly, the PHY 202B of NR provides transport channels to the NR MAC sublayer 204B, which in turn provides logical channels to the NR RLC sublayer 206B, and the NR RLC sublayer 206B in turn provides RLC channels to the NR PDCP sublayer 210. The UE 102 in some implementations supports both the EUTRA and the NR stack, to support handover between EUTRA and NR base stations and/or DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from the Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange Radio Resource Control (RRC) messages, for example. On a user plane, the EUTRA PDCP sublayer 208 and the NR PDCP sublayer 210 provide DRBs to support data exchange.

When the UE 102 operates in EUTRA/NR DC (EN-DC), with the BS 104A operating as a MeNB and the BS 106A operating as a SgNB, the network can provide the UE 102 with an MN-terminated bearer that uses EUTRA PDCP 208 or MN-terminated bearer that uses NR PDCP 210. The network in various scenarios also can provide the UE 102 with an SN-terminated bearer, which use only NR PDCP 210. The MN-terminated bearer can be an MCG bearer or a split bearer. The SN-terminated bearer can be a SCG bearer or a split bearer. The MN-terminated bearer can be an SRB (e.g., SRB1 or SRB2) or a DRB. The SN-terminated bearer can an SRB (e.g., SRB) or a DRB.

Figure 3:
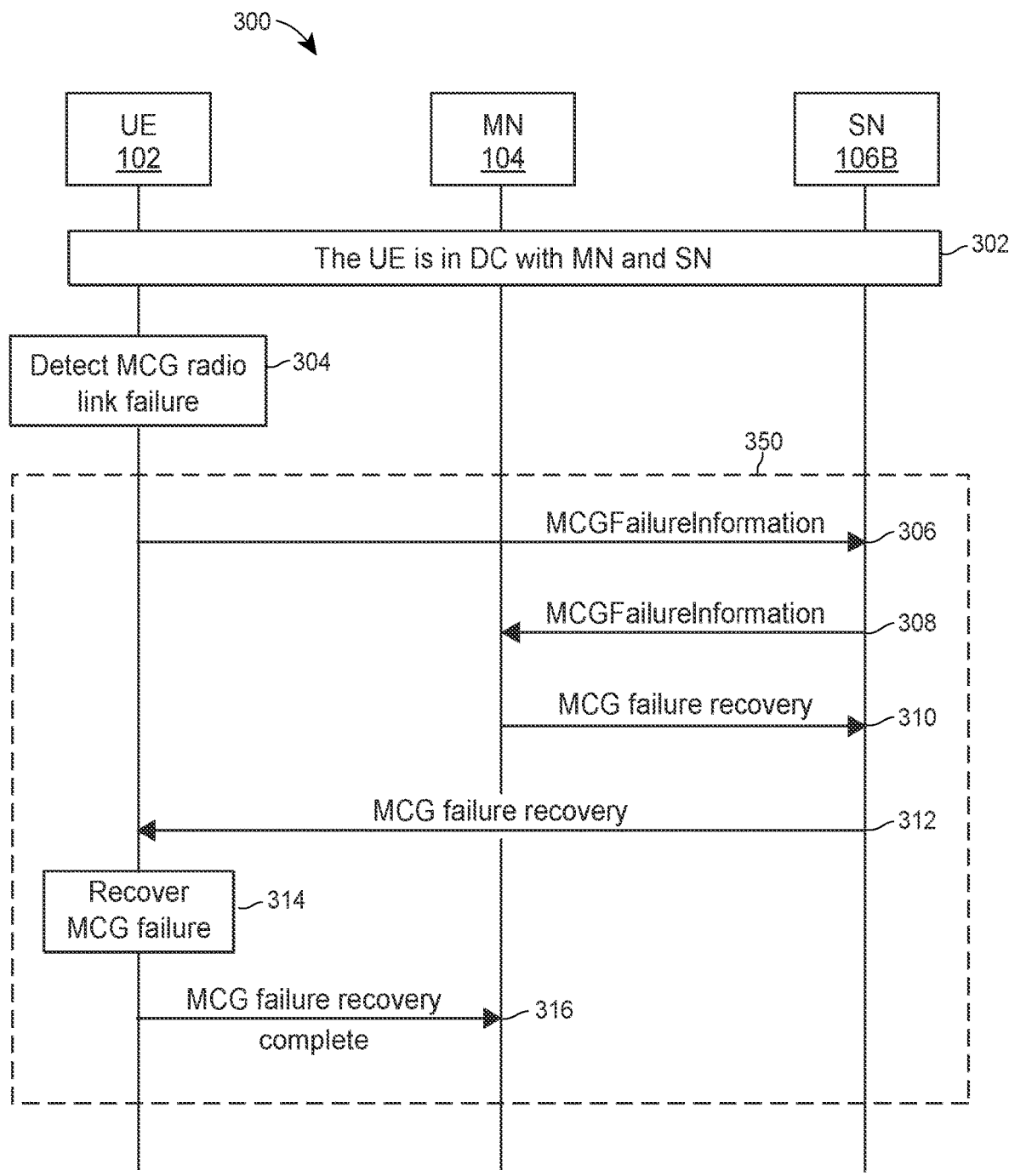
FIG. 3 is a messaging diagram of an example scenario in which a UE notifies a master node (MN) of a master cell group (MCG) failure that the UE, which operates in dual connectivity (DC) with the MN, has detected and the UE, the MN, and an SN perform a known procedure for fast recovery of an MCG link.

Referring first to FIG. 3, the base station 104 operates as an MN, and the base station 106B operates as an SN. At the beginning, the UE 102 is in DC 302 with the MN 104 and the SN 106B. The UE 102 detects 304 MCG radio link failure (i.e., radio link failure on an MCG link configured by the MN 104). In response to the detection 304, the UE 102 transmits 306 an MCG Failure Information (MCGFailureInformation) message to the SN 106B. The SN 106B sends 308 the MCGFailureInformation message to the MN 104. In response to the MCGFailureInformation message, the MN 104 generates an MCG failure recovery message for the UE 102 to recover the MCG radio link failure the UE detected at event 304. Then the MN 104 sends 310 the MCG failure recovery message (e.g., an RRC reconfiguration message) to the SN 106 and the SN 106B in turn sends 312 the MCG failure recovery message to the UE 102. The UE 102 recovers 314 the MCG failure according to the MCG failure recovery message and transmits 316 an MCG failure recovery complete message (e.g., an RRC reconfiguration complete message) to the MN 104 in response to the MCG failure recovery message.

The events 306, 308, 310, 312, 314, 316 collectively can be considered to define an MCG fast recovery procedure 350.

Figure 4:
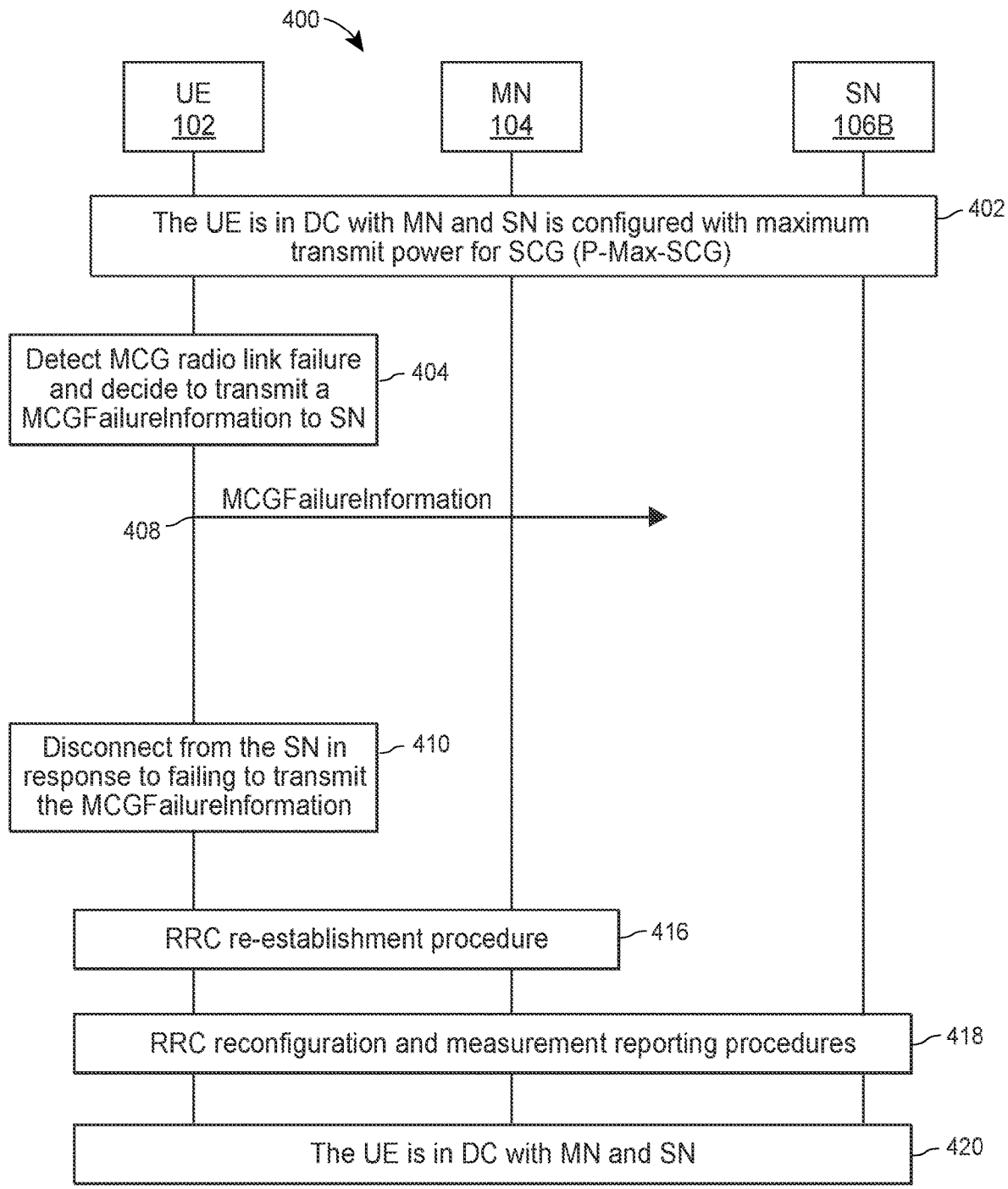
FIG. 4 is a messaging diagram of an example scenario in which a UE that is configured with a maximum transmit power for a secondary cell group (SCG) detects a MCG radio link failure.

FIG. 4 illustrates a scenario 400 in which the base station 104 operates as an MN, and the base station 106B operates as an SN. The UE 102 is in DC 402 with the MN 104 and the SN 106B and is configured with a maximum transmit power for the SCG (P-Max-SCG). The P-Max-SCG restricts the maximum transmit power that the UE 102 can use to transmit an uplink transmission to the SN 106B on the SCG. The P-Max-SCG is lower than the maximum transmit power that the UE 102 is capable of.

The UE 102 detects 404 MCG radio link failure and decides to transmit an MCG Failure Information (MCGFailureInformation) message to the SN 106B. In response to the decision, the UE 102 transmits 408 the MCGFailureInformation message to the SN 106B. The UE 102 transmits the MCGFailureInformation message with P-Max-SCG power, which is not enough power for the SN 106B to receive the MCGFailureInformation message. The UE 102 then disconnects 410 from the SN and performs 416 an RRC re-establishment procedure with the MN 104 in response to failing to transit the MCGFailureInformation message. After successfully performing the RRC re-establishment procedure, the MN 104 may perform 418 plural RRC reconfiguration procedures and measurement reporting procedures with the UE 102 to configure 420 the UE 102 in DC with the MN 104 and the SN 106B again or configure the 102 in DC with the MN 104 and SN 106A (not shown in FIG. 4). Then the UE is in DC with the MN 104 and SN 106B (or 106A). However, during this process data transmission between the UE 102 and the MN 104/SN 106B is interrupted by the RRC re-establishment procedure 416 because the UE 102 suspends data radio bearer(s) for data communication the UE 102 and the MN 104/SN 106B. Additionally, the MN 104 performs 418 the RRC reconfiguration procedures and measurement report procedures with the UE 102 to bring the UE 102 back to DC. This takes time to configure the UE 102 in DC to provide a higher data rate for data communication.

Figure 5:
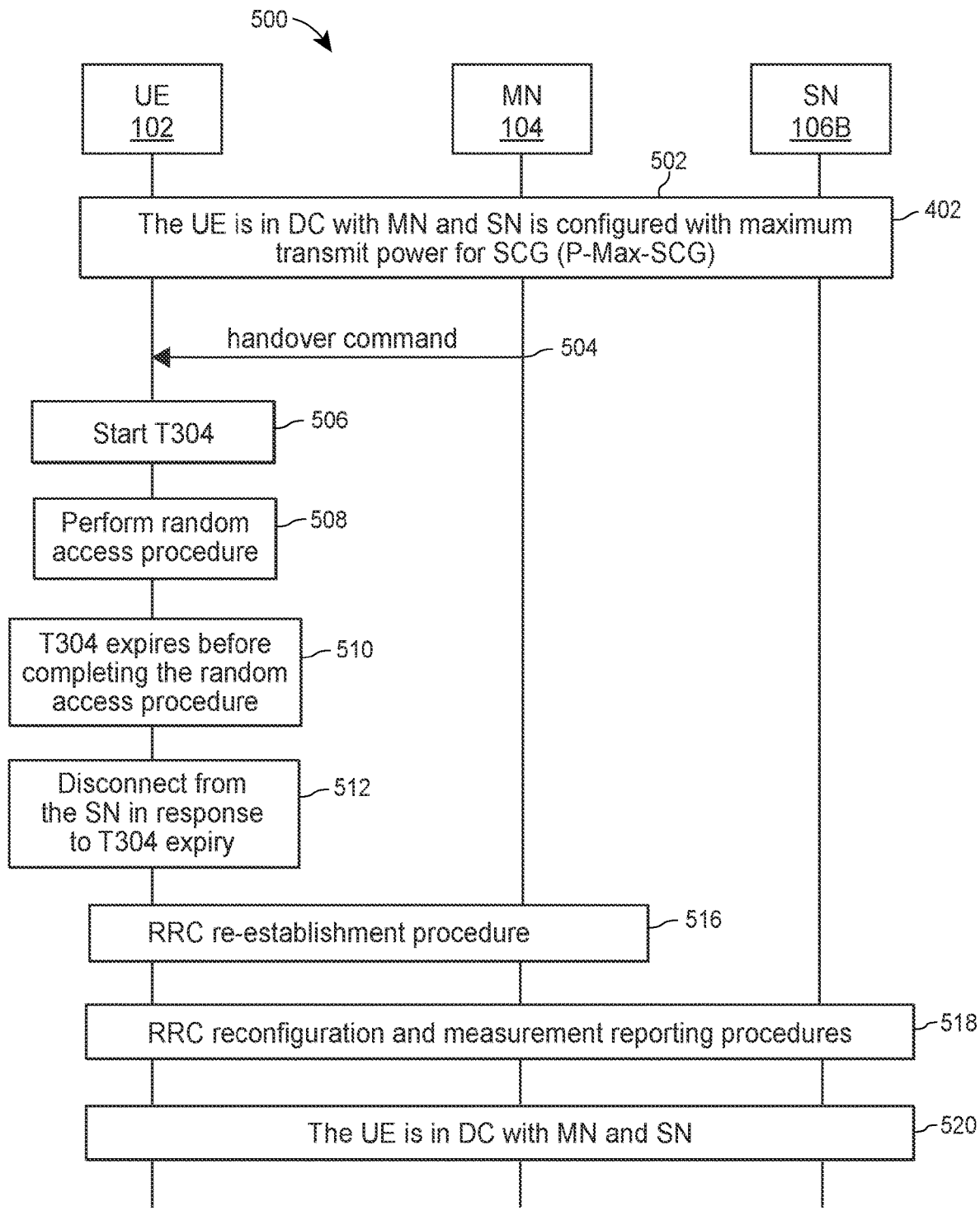
FIG. 5 is a messaging diagram of an example scenario in which a UE receives a handover command from an MN, performs a random access procedure on a PCell configured by the handover command, and a timer expires before completing the random access procedure.

FIG. 5 illustrates a scenario 500 in which the base station 104 operates as an MN, and the base station 106B operates as a SN. The UE 102 is in DC 502 with the MN 104 and the SN 106B.

The UE 102 receives 504 a handover command from the MN 104. In response to the handover command, the UE 102 starts 506 a timer T304 and performs 508 a random access procedure on a PCell configured by the handover command. The timer T304 expires 510 before completing the random access procedure. In response to the T304 expiry, the UE 102 disconnects 512 from the SN 106B and performs 516 an RRC reestablishment procedure. After successfully performing the RRC re-establishment procedure 516, the MN 104 may perform 518 plural RRC reconfiguration procedures and measurement reporting procedures with the UE 102 to configure 520 the UE 102 in DC with the MN 104 and the SN 106B again or configure the 102 in DC with the MN 104 and SN 106A (not shown in FIG. 5). Then the UE is in DC with the MN 104 and SN 106B (or 106A). However, data transmission between the UE 102 and the MN 104/SN 106B is interrupted by the RRC re-establishment procedure 516 because the UE 102 suspends data radio bearer(s) for data communication the UE 102 and the MN 104/SN 106B. Additionally, the MN 104 performs 518 the RRC reconfiguration procedures and measurement report procedures with the UE 102 to bring the UE 102 back to DC. This takes time to configure the UE 102 in DC to provide a higher data rate for data communication.

Figure 6:
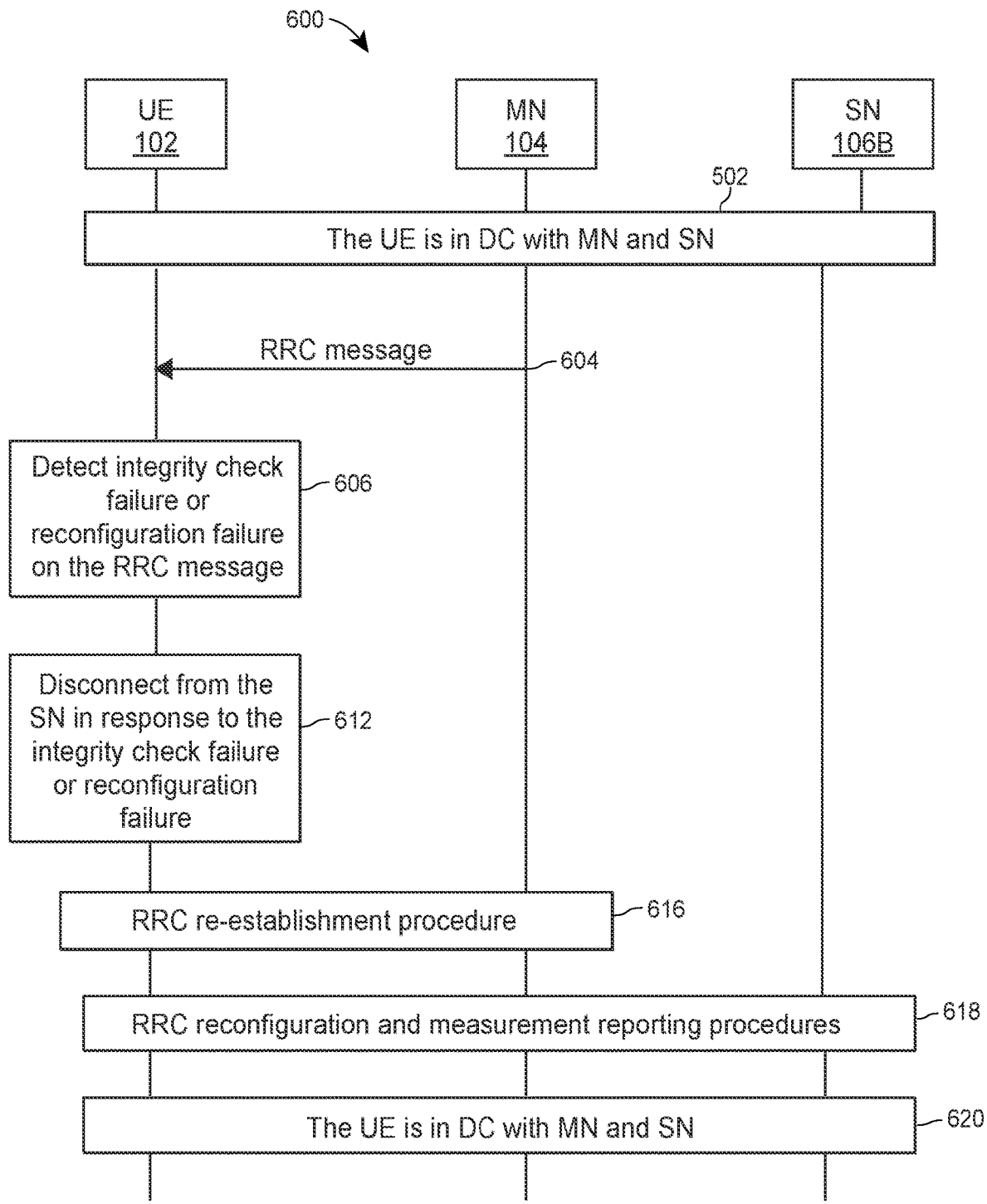
FIG. 6 is a messaging diagram of an example scenario in which a UE receives a Radio Resource Control (RRC) message from an MN, and detects integrity check failure or configuration failure on the RRC message.

FIG. 6 illustrates a scenario 600 in which the base station 104 operates as an MN, and the base station 106B operates as an SN. The UE 102 is in DC 602 with the MN 104 and the SN 106B.

The UE 102 receives 604 an RRC message from the MN 104. Then the UE 102 detects 606 an integrity check failure or a reconfiguration failure on the RRC message. In response to the integrity check failure or reconfiguration failure, the UE 102 disconnects 612 from the SN 106B and performs 616 an RRC reestablishment procedure with the MN 104. After successfully performing the RRC re-establishment procedure 616, the MN 104 may perform 618 plural RRC reconfiguration procedures and measurement reporting procedures with the UE 102 to configure 620 the UE 102 in DC with the MN 104 and the SN 106B again or configure the 102 in DC with the MN 104 and SN 106A (not shown in FIG. 6). Then the UE is in DC with the MN 104 and SN 106B (or 106A). However, data transmission between the UE 102 and the MN 104/SN 106B is interrupted by the RRC re-establishment procedure 616 because the UE 102 suspends data radio bearer(s) for data communication the UE 102 and the MN 104/SN 106B. Additionally, the MN 104 performs 618 the RRC reconfiguration procedures and measurement report procedures with the UE 102 to bring the UE 102 back to DC. This takes time to configure the UE 102 in DC to provide a higher data rate for data communication.

Figure 7:
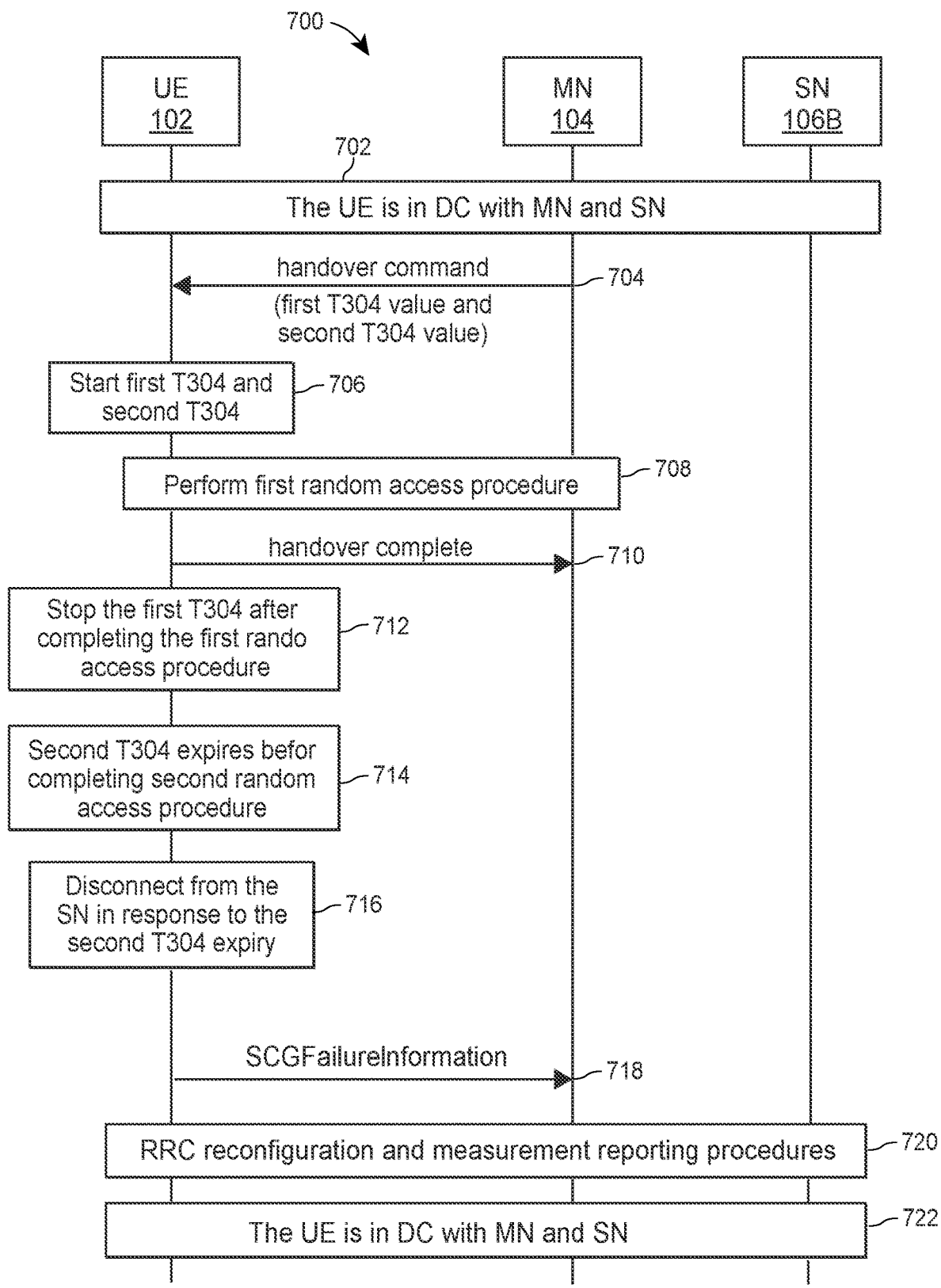
FIG. 7 is a messaging diagram of an example scenario in which a UE receives a handover command from an MN including a first timer value and a second timer value for first and second timers, respectively, for a first random access procedure on a PCell configured by the handover command and a second random access procedure on a PSCell configured by the handover command.

FIG. 7 illustrates a scenario 700 in which the base station 104 operates as an MN, and the base station 106B operates as an SN. The UE 102 is in DC 702 with the MN 104 and the SN 106B.

The UE 102 receives 704 from the MN 104 a handover command including a first T304 timer value and a second T304 timer value. In response to the handover command, the UE 102 starts 706 a first timer T304 with the first T304 timer value and a second timer T304 with the second T304 timer value upon receiving the handover command. The UE 102 performs 708 a random access procedure on a PCell configured by the handover command and transmits 710 a handover complete message to the MN 104 in response to the handover command. The UE 102 stops 712 the first timer T304 after completing the first random access procedure. The UE 102 then performs a second random access procedure on a PSCell configured by the handover command after completing the first random access procedure. However, the second timer T304 expires 714 before completing the second random access procedure. In response to the second timer T304 expiry, the UE 102 disconnects 716 from the SN 106B and transmits 718 an SCGFailureInformation message to the MN 104. In response to the SCGFailureInformation message, the MN 104 may perform 720 plural RRC reconfiguration and measurement reporting procedures with the UE 102 to configure 722 the UE 102 in DC with the MN 104 and the SN 106B again or configure the UE 102 in DC with the MN 104 and SN 106A (not shown in FIG. 7). Then the UE is in DC with the MN 104 and SN 106B (or 106A). However, data transmission between the UE 102 and the MN 104/SN 106B is interrupted by the RRC re-establishment procedure 716 because the UE 102 suspends data radio bearer(s) for data communication the UE 102 and the MN 104/SN 106B. Additionally, the MN 104 performs 718 the RRC reconfiguration procedures and measurement report procedures with the UE 102 to bring the UE 102 back to DC. This takes time to configure the UE 102 in DC to provide a higher data rate for data communication.

Figure 8:
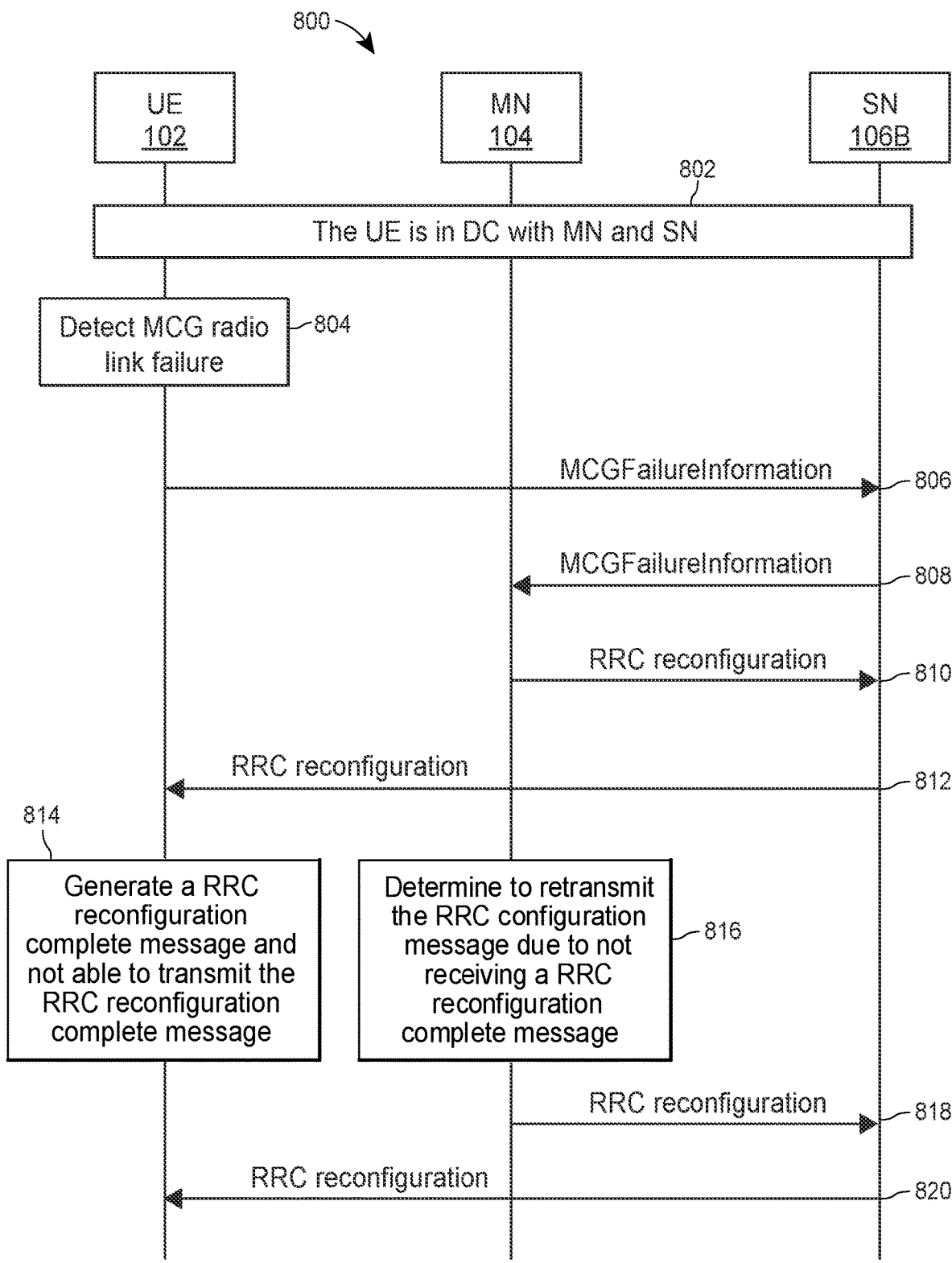
FIG. 8 is a messaging diagram of an example scenario in which a UE detects a MCG radio link failure, and transmits an MCGFailureInformation message to an SN.

FIG. 8 illustrates a scenario 800 in which the base station 104 operates as an MN, and the base station 106B operates as an SN. The UE 102 is in DC 802 with the MN 104 and the SN 106B. The UE 102 detects 804 MCG radio link failure (i.e., radio link failure on a MCG link configured by the MN 104). In response to the detection 804, the UE 102 transmits 806 an MCGFailureInformation message to the SN 106B. The SN 106B sends 808 the MCGFailureInformation message to the MN 104. In response to MCGFailureInformation message, the MN 104 generates an MCG failure recovery message for the UE 102 to recover the MCG radio link failure the UE detected at event 804. Then the MN 104 sends 810 the RRC reconfiguration message to the SN 106B and the SN 106 in turn sends 812 the RRC reconfiguration message to the UE 102. The UE 102 generates 814 an RRC reconfiguration complete message to respond the RRC reconfiguration message and intends to transmit the RRC reconfiguration complete message to the MN 104. However, the UE 102 is not able to transmit the RRC reconfiguration complete message to the MN 104 because the UE 102 has not recovered the MCG radio link failure. The UE 102 may not transmit the RRC reconfiguration complete message until recovering the MCG radio link failure. Because the MN 104 does not receive the RRC reconfiguration complete message from the UE 102, the MN 104 may determine 816 to retransmit the RRC reconfiguration message. In response to the determination 816, the MN 104 sends 818 the RRC reconfiguration message to the SN 106B and in turn the SN 106B transmits 820 the RRC reconfiguration message to the UE 102. The UE 102 may perform 814 again, which causes a deadlock between the UE 102 and the MN 104.

To address the problems described above with reference to FIGS. 4-8, such as interrupting data transmission between the UE 102 and the MN 104/SN 106B, the amount of time it takes to perform the RRC reconfiguration procedures and measurement report procedures, deadlock between the UE 102 and the MN 104, procedures are described below with reference to FIGS. 9-16. These procedures may include performing an MCG fast recovery procedure in response to detecting an MCG failure, the expiry of a timer before completing a random access procedure, or an integrity check failure or reconfiguration failure of an RRC message. These procedures may also include configuring timers for a first random access procedure between the UE 102 and the MN 104 and a second random access procedure between the UE 102 and the SN 106B so that the second timer value is longer than the first timer value, performing the first and second random access procedures simultaneously, or starting the timers at different times. Moreover, these procedures may include determining whether an RRC reconfiguration message configures a PCell, transmitting an RRC configuration complete message to the MN 104 if the RRC reconfiguration message configures a PCell, and transmitting the RRC configuration complete message to the SN 106B if the RRC reconfiguration message does not configure a PCell, or generating, by the MN 104, an RRC reconfiguration message including a PCell.

Figure 9:
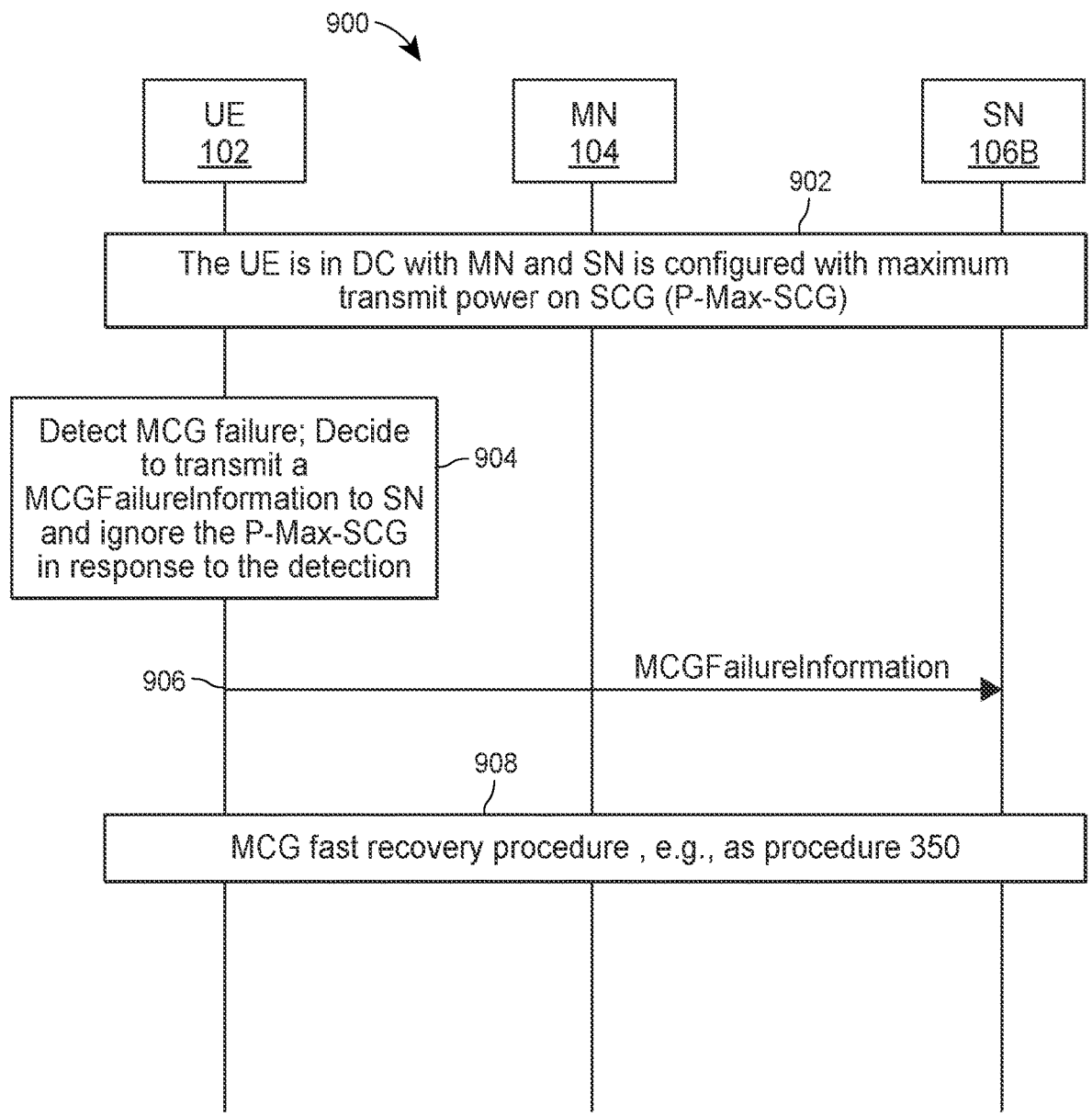
FIG. 9 is a messaging diagram of an example scenario in which a UE that is configured with a maximum transmit power for a secondary cell group (SCG) detects a MCG radio link failure, and transmits an MCGFailureInformation message using a transmit power above the configured maximum transmit power for the SCG.

FIG. 9 illustrates a scenario 900 in which the base station 104 operates as an MN, and the base station 106B operates as an SN. The UE 102 is in DC 902 with the MN 104 and the SN 106B. The UE 102 detects 904 MCG failure and the UE 102 decides to transmit a MCGFailureInformation message to the SN 106B and ignores the P-Max-SCG in response to detecting the MCG failure. The UE 102 transmits 906 the MCGFailureInformation message to the SN 106B using a transmit power above the P-Max-SCG. Then the UE 102 performs 908 an MCG fast recovery procedure 350. Because the UE 102 ignores the P-Max-SCG, the UE 102 can transmit the MCGFailureInformation message 906 to the SN 106B using a transmit power above the P-Max-SCG.

The P-Max-SCG is the maximum total transmit power to be used by the UE 102 in the SCG. In some implementations, the P-Max-SCG is the maximum total transmit power to be used by the UE 102 in the SCG across all serving cells in frequency range 1 (FR1). For example, the P-Max-SCG can be a p-MaxUE-FR1 defined in 3GPP Technical Specification (TS) 36.331 or a p-NR-FR1 defined in 3GPP TS 38.331.

In some implementations, before detecting the MCG failure, the UE 102 may be configured by the MN 104 to have a maximum total transmit power (e.g., p-UE-FR1) that the UE 102 can use to transmit on MCG and SCG. The UE 102 may keep the maximum total transmit power in response to the MCG failure and transmit uplink transmission(s) on SCG with a transmit power not exceeding the maximum total transmit power before recovering the MCG failure. In some implementations, the MN 104 may configure a new P-Max-SCG to the UE 102 in the MCG failure recovery message and the UE 102 may transmit an uplink transmission(s) on the SCG with a transmit power that does not exceed the new P-Max-SCG after recovering the MCG failure.

In some implementations, the MN 104 or the SN 106B may configure a time division multiplexing (TDM) pattern for the UE 102. The TDM pattern configuration includes a UL/DL reference configuration indicating the time during which the UE 102 configured with (NG)EN-DC or NE-DC is allowed to transmit. For example, the TDM pattern can be a tdm-PatternConfig or tdm-PatternConfigNE-DC defined in 3GPP TS 36.331.

In some implementations, the UE 102 may release the TDM pattern configuration in response to detecting the MCG failure. In response to releasing the TDM pattern configuration, the UE 102 may transmit in a slot on the SCG when a corresponding subframe on the MCG is a UL subframe in the TDM pattern configuration. In response to receiving the MCGFailureInformation message, the SN 106B in one implementation may release the TDM pattern configuration and configure the UE 102 to transmit in a slot on the SCG when a corresponding subframe (i.e., corresponding to the slot) on the MCG is a UL subframe in the TDM pattern configuration. In another implementation, the MN 104 may send an interface message to request the SN 104B to release the TDM pattern configuration. In response to receiving the interface message, the SN 106B in one implementation may release the TDM pattern configuration and configure the UE 102 to transmit in a slot on the SCG when a corresponding subframe on the MCG is a UL subframe in the TDM pattern configuration.

In other implementations, the UE 102 may maintain (or keep) the TDM pattern configuration configured by the MN 102 or the SN 106B in response to detecting the MCG failure. According to the TDM pattern configuration, the UE 102 may not transmit in a slot on the SCG when a corresponding subframe on the MCG is a UL subframe in the TDM pattern configuration. In response to receiving the MCGFailureInformation message, the SN 106B in one implementation may keep the TDM pattern configuration. In response to keeping the TDM pattern configuration, the SN 106B configures the UE 102 to transmit in a slot on the SCG when a corresponding subframe on the MCG is a DL subframe in the TDM pattern configuration. That is, the SN 106B and the UE 102 still follow the TDM pattern configuration to communicate with each other while the UE 102 encounters the MCG failure.

In some implementations, the MCG failure can be an MCG radio link failure, a handover failure, an MCG reconfiguration with sync failure, an integrity failure on an RRC message received from the MN 104 or reconfiguration failure on an RRC message (e.g., RRC reconfiguration message) received from the MN 104.

Figure 10:
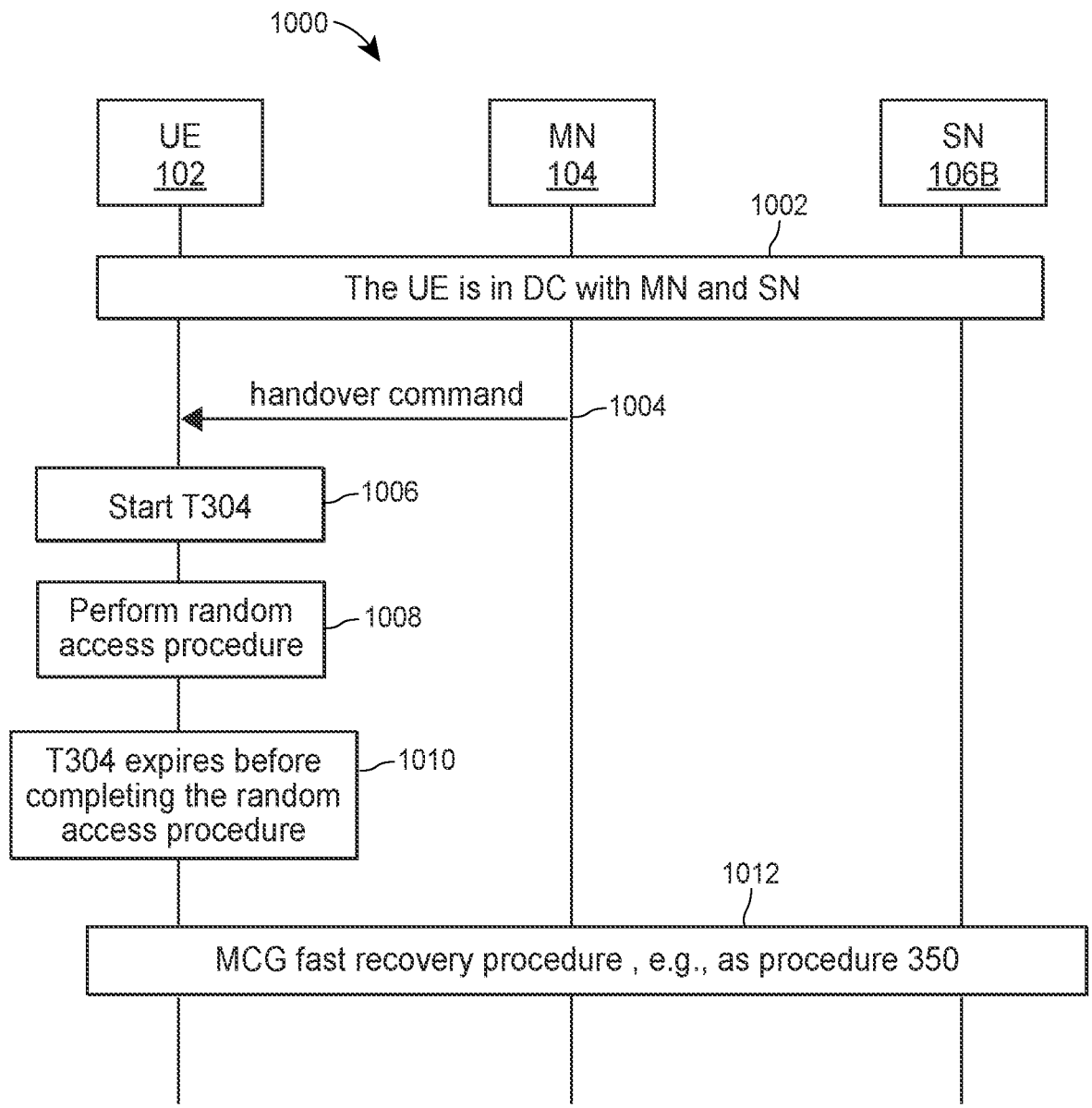
FIG. 10 is a messaging diagram of an example scenario in which a UE receives a handover command from an MN, performs a random access procedure on a PCell configured by the handover command, a timer expires before completing the random access procedure, and the UE, the MN, and an SN perform a known procedure for fast recovery of an MCG link.

Next, FIG. 10 illustrates a scenario 1000 in which the base station 104 operates as an MN, and the base station 106B operates as an SN. The UE 102 is in DC 1002 with the MN 104 and the SN 106B.

The UE 102 receives 1004 a handover command from the MN 104. In response to the handover command, the UE 102 starts 1006 a timer T304 and performs 1008 a random access procedure on a PCell configured by the handover command to hand over to the PCell. The timer T304 expires 1010 before completing the random access procedure. In response to the T304 expiry, the UE 102 performs 1012 an MCG fast recovery procedure 350 instead of disconnecting from the SN 106B and performing an RRC reestablishment procedure. Thus, the UE 102 can recover a connection with the MN 104 through a connection with the SN 106B to avoid having to perform time consuming RRC reconfiguration procedures and measurement report procedures.

In some implementations, the handover command may include a T304 timer value for the UE 102 to use when starting the T304 timer. In some implementations, the handover command may include one or more configurations for the UE 102 to perform the random access procedure.

In some implementations, the handover command can be an RRC reconfiguration message including a ReconfigurationWithSync IE. In other implementations, the handover command can be an RRC reconfiguration message including a MobilityControlInfo IE.

Figure 11:
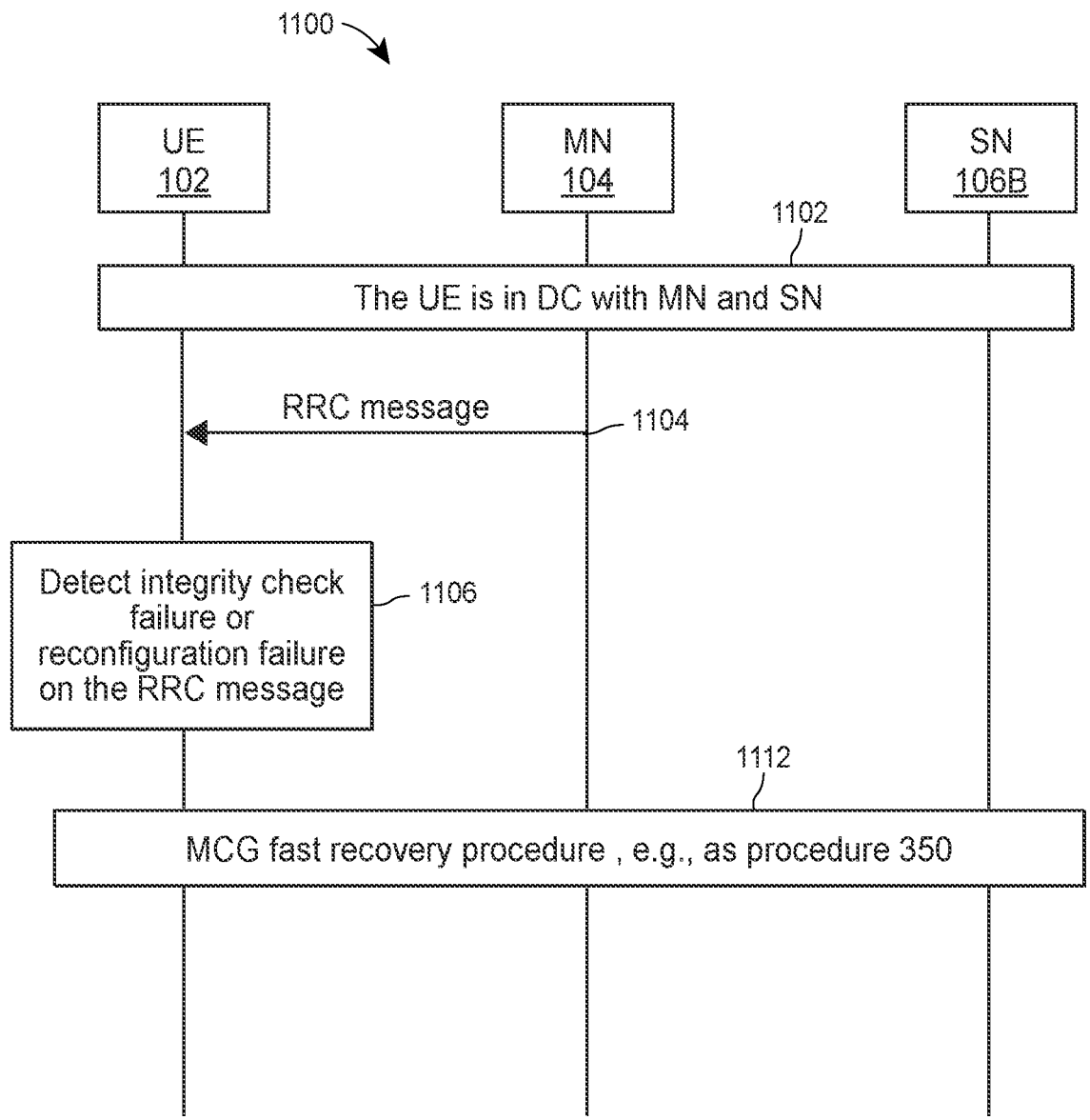
FIG. 11 is a messaging diagram of an example scenario in which a UE receives a Radio Resource Control (RRC) message from an MN, detects integrity check failure or configuration failure on the RRC message, and the UE, the MN, and an SN perform a known procedure for fast recovery of an MCG link.

FIG. 11 illustrates a scenario 1100 in which the base station 104 operates as an MN, and the base station 106B operates as an SN. The UE 102 is in DC 1102 with the MN 104 and the SN 106B.

The UE 102 receives 1104 an RRC message from the MN 104. The UE 102 then detects 1106 an integrity check failure or reconfiguration failure on the RRC message. In response to the integrity check failure or reconfiguration failure, the UE 102 performs 1112 an MCG fast recovery procedure 350 instead of disconnecting from the SN 106B and performing an RRC reestablishment procedure. Thus, the UE 102 can recover a connection with the MN 104 through a connection with the SN 106B to avoid having to perform time consuming RRC reconfiguration procedures and measurement report procedures.

In some implementations, the UE 102 receives the RRC message on SRB1 from the MN 104. In some implementations, the RRC message can be a DL-DCCH-Message specified in 3GPP TS 36.331 or TS 38.331. In some implementations, the SN 106B configures SRB3 for the UE 102 which, in turn, transmits the MCGFailureInformation message when performing the MCG fast recovery procedure 350 on the SRB3 to the SN 106B. Then the SN 106B forwards the MCGFailureInformation message to the MN 104.

Figure 12:
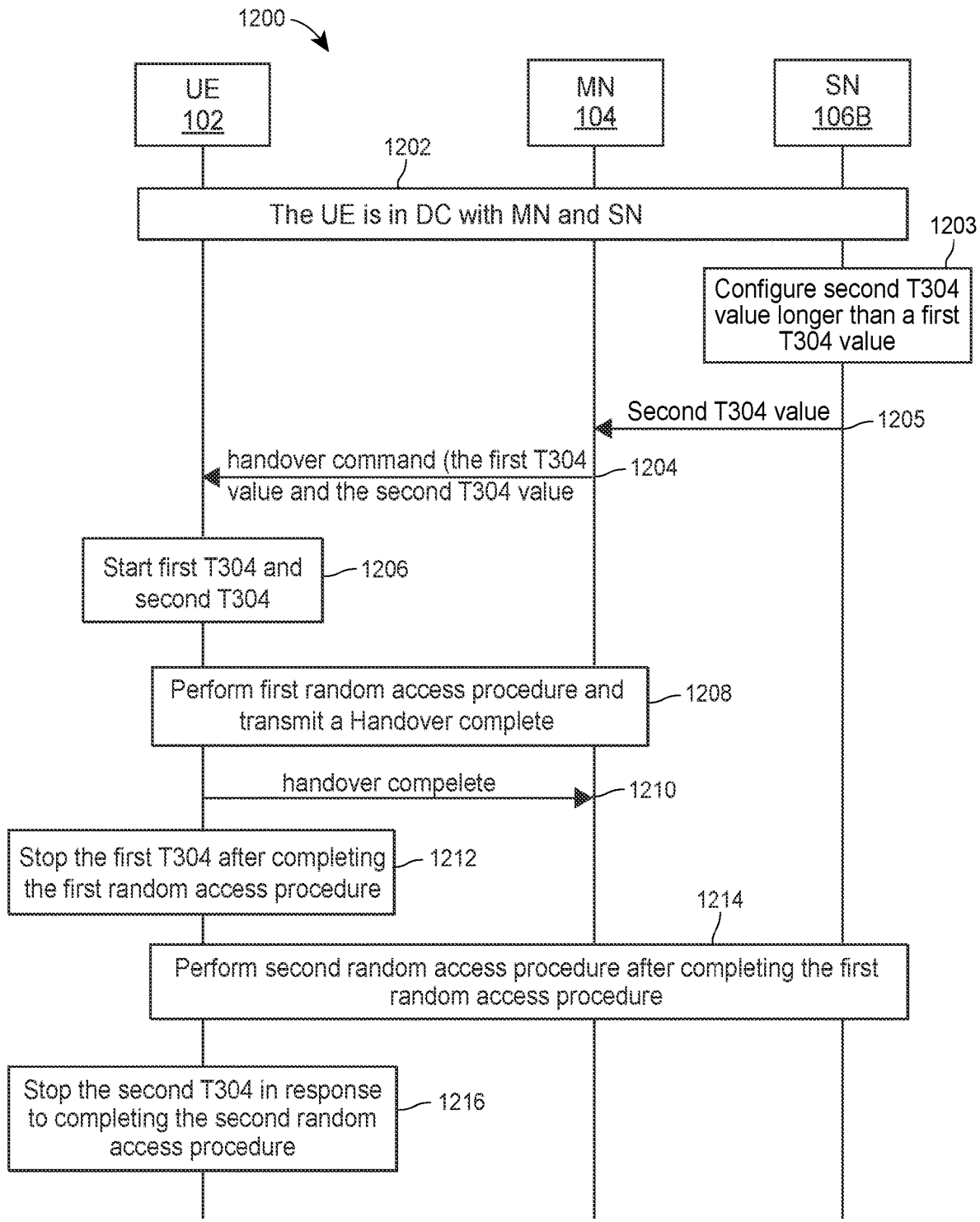
FIG. 12 is a messaging diagram of an example scenario in which a UE receives a handover command from an MN including a first timer value and a second timer value for first and second timers, respectively, for a first random access procedure on a PCell configured by the handover command and a second random access procedure on a PSCell configured by the handover command, where the second timer value is longer than the first timer value.

FIG. 12 illustrates a scenario 1200 in which the base station 104 operates as an MN, and the base station 106B operates as an SN. The UE 102 is in DC 1202 with the MN 104 and the SN 106B.

The SN 106B configures 1203 a second T304 timer value to be longer than a first T304 timer value and sends 1205 the second T304 timer value to the MN 104. Then, the UE 102 receives 1204 from the MN 104 a handover command including the first T304 timer value and the second T304 timer value. In response to the handover command, the UE 102 starts 1206 a first timer T304 with the first T304 timer value and a second timer T304 with the second T304 timer value upon receiving the handover command. The UE 102 performs 1208 a first random access procedure on a PCell configured by the handover command and transmits 1210 a handover complete message to the MN 104 in response to the handover command. The UE 102 stops 1212 the first timer T304 after completing the first random access procedure. The UE 102 performs 1214 a second random access procedure on a PSCell configured by the handover command after completing the first random access procedure. The UE 102 stops 1216 the second timer T304 in response to completing the second random access procedure. Because the second T304 timer value is larger than the first T304 timer value, the UE 102 can complete the second random access procedure before the second timer T304 expires. Thus, the UE 102 can complete the handover and the PSCell change configured by the handover command to avoid having to perform time consuming RRC reconfiguration procedures and measurement report procedures.

In some implementations, the handover command can be an RRC reconfiguration message including a ReconfigurationWithSync IE. In other implementations, the handover command can be an RRC reconfiguration message including a MobilityControlInfo IE. The handover complete message can be an RRC reconfiguration complete message. The UE 102 may transmit the handover complete message in the first random access procedure or after the first random access procedure.

In some implementations, the MN 104 sends an SN Request message (e.g., SN Addition Request or SN Modification Request) to the SN 106B. The SN 106B sends an SN Request Acknowledge message (e.g., SN Addition Request Acknowledge or SN Modification Request Acknowledge) to the MN 104 in response to the SN Request message. The SN 106B includes an RRC reconfiguration message including the second T304 timer value in the SN Request Acknowledge message and sends the SN Request Acknowledge message at event 1205.

In other implementations, the MN 104 may receive the second T304 timer value from SN 106A instead of the SN106B. In this case, the SN 106A configures the second T304 timer value longer to be than the first T304 timer value. In one implementation, the MN 104 sends an SN Request message (e.g., SN Addition Request or SN Modification Request) to the SN 106A instead of the SN 106B. The SN 106A sends an SN Request Acknowledge message (e.g., SN Addition Request Acknowledge or SN Modification Request Acknowledge) to the MN 104 in response to the SN Request message. The SN 106A includes an RRC reconfiguration message including the second T304 timer value in the SN Request Acknowledge message and sends the SN Request Acknowledge message to the MN 104 instead of event 1205. In this case, the UE 102 performs the second random access procedure with the SN 106A instead of the SN 106B after completing the first random access procedure.

In yet other implementations, the MN 104 may receive the handover command from a base station (i.e., a new MN not shown in FIG. 12) in a Handover Request Acknowledge message in a handover preparation procedure. The new MN receives the second T304 timer value from the SN 106A and the SN 106A configures the second T304 timer value to be longer than the first T304 timer value. In one implementation, the new MN sends an SN Request message (e.g., SN Addition Request or SN Modification Request) to the SN 106A. The SN 106A sends an SN Request Acknowledge message (e.g., SN Addition Request Acknowledge or SN Modification Request Acknowledge) to the new MN in response to the SN Request message. The SN 106A includes an RRC reconfiguration message including the second T304 timer value in the SN Request Acknowledge message and sends the SN Request Acknowledge message to the new MN. In this case, the UE 102 performs the first random access procedure with the new MN instead of the MN 104 and performs the second random access procedure with the SN 106A instead of the SN 106B after completing the first random access procedure.

In further implementations, the MN 104 may receive the handover command from a base station (i.e., a new MN not shown in FIG. 1) in a Handover Request Acknowledge message in a handover preparation procedure. The new MN receives the second T304 timer value from the SN 106B and the SN 106B configures the second T304 timer value to be longer than the first T304 timer value. In one implementation, the new MN sends an SN Request message (e.g., SN Addition Request or SN Modification Request) to the SN 106B. The SN 106B sends an SN Request Acknowledge message (e.g., SN Addition Request Acknowledge or SN Modification Request Acknowledge) to the new MN in response to the SN Request message. The SN 106B includes an RRC reconfiguration message including the second T304 timer value in the SN Request Acknowledge message and sends the SN Request Acknowledge message to the new MN. In this case, the UE 102 performs the first random access procedure with the new MN instead of the MN 104 and performs the second random access procedure with the SN 106B after completing the first random access procedure.

Figure 13:
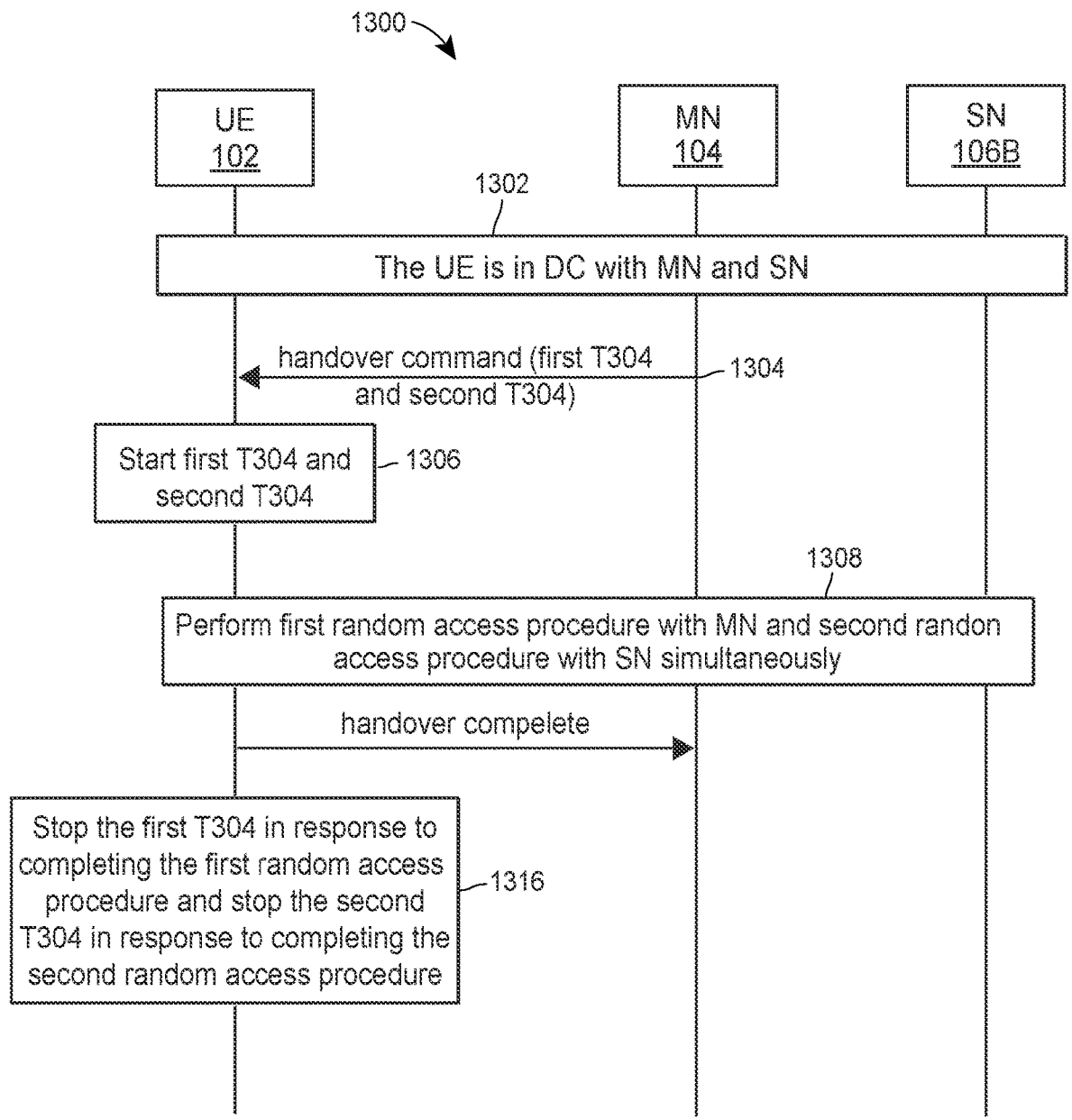
FIG. 13 is a messaging diagram of an example scenario in which a UE receives a handover command from an MN including a first timer value and a second timer value for first and second timers, respectively, for a first random access procedure on a PCell configured by the handover command and a second random access procedure on a PSCell configured by the handover command, where the first and second random access procedures are performed simultaneously.

FIG. 13 illustrates a scenario 1300 in which the base station 104 operates as an MN, and the base station 106B operates as a SN. FIG. 13 is similar to FIG. 12 in that the MN 104 transmits 1304 a handover command to the UE 102 which includes a first T304 timer value and a second T304 timer value.

The UE 102 receives 1304 from the MN 104 the handover command including the first T304 timer value and the second T304 timer value. In response to the handover command, the UE 102 starts 1306 a first timer T304 with the first T304 timer value and a second timer T304 with the second T304 timer value upon receiving the handover command. The UE 102 simultaneously performs 1308 a first random access procedure on a PCell (configured by the handover command) with the MN 104 and performs a second random access procedure on a PSCell (configured by the handover command) with the SN 106B. The UE 102 transmits 1310 a handover complete message to the MN 104 in response to the handover command. The UE 102 stops 1316 the first timer T304 in response to completing the first random access procedure and stops the second timer T304 in response to completing a second random access procedure. Because the UE 102 simultaneously performs the first and second random access procedures, the UE 102 can complete the second random access procedure before the second timer T304 expires regardless of whether the second T304 timer value is larger than the first T304 timer value. Thus, the UE 102 can complete the handover and the PSCell change configured by the handover command to avoid having to perform time consuming RRC reconfiguration procedures and measurement report procedures.

In some implementations, the UE 102 may perform the first and second random access procedures in an interweaving manner. For example, the UE 102 may transmit a first random access preamble on the PCell and transmit a second random access preamble on the PSCell at different times (e.g., slots or subframes). The UE 102 may then receive a first random access response (responding to the first random access preamble) on the PCell and a second random access response (responding to the second random access preamble) on the PSCell at the same or different times (e.g., slots or subframes).

Figure 14A:
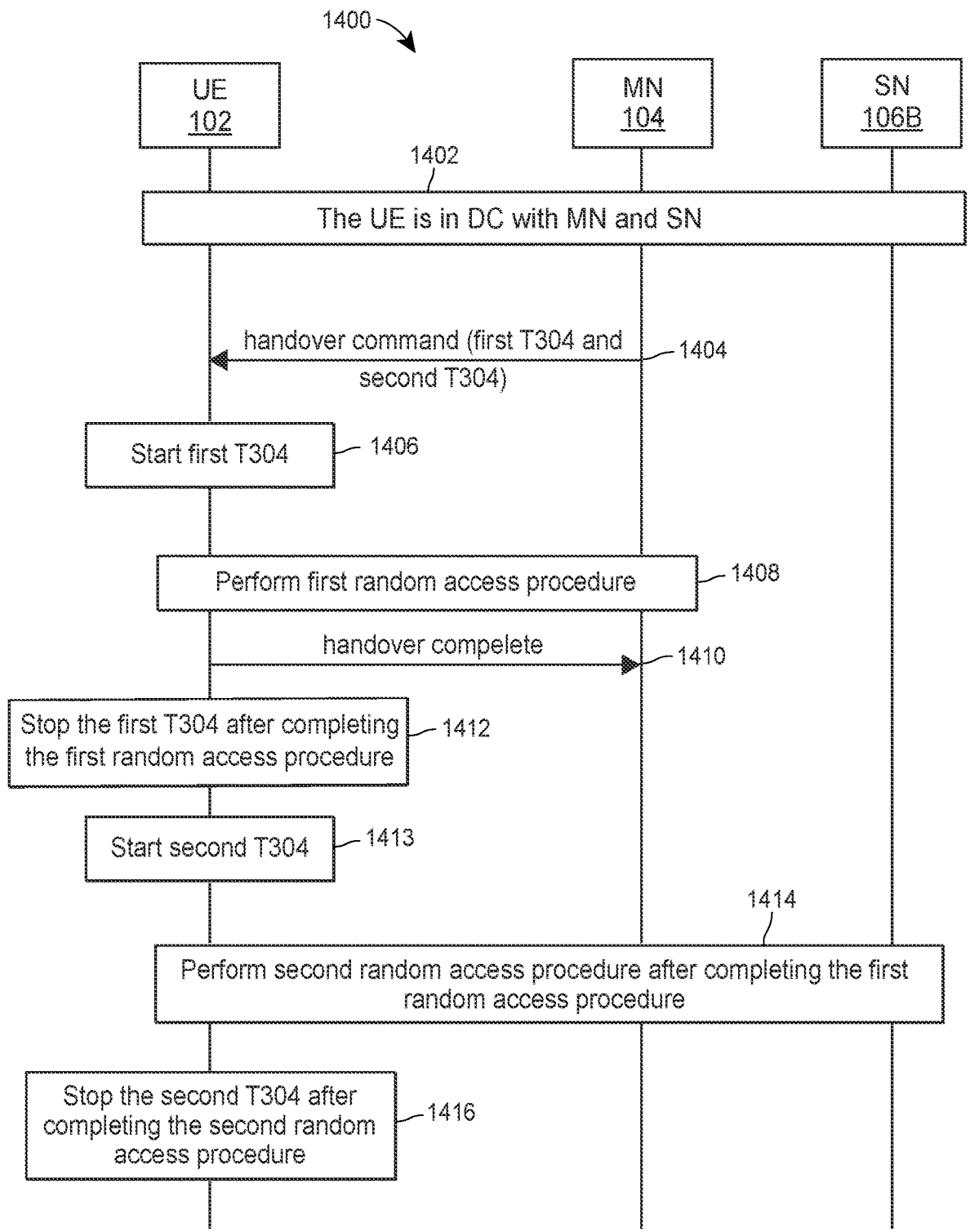
FIG. 14A is a messaging diagram of an example scenario in which a UE receives a handover command from an MN including a first timer value and a second timer value for first and second timers, respectively, for a first random access procedure on a PCell configured by the handover command and a second random access procedure on a PSCell configured by the handover command, where the second timer is started after the first timer.

FIG. 14A illustrates a scenario 1400 in which the base station 104 operates as an MN, and the base station 106B operates as a SN. As with FIG. 13, FIG. 14A is similar to FIG. 12 in that the MN 104 transmits 1404 a handover command to the UE 102 which includes a first T304 timer value and a second T304 timer value.

In this example scenario, the UE 102 starts 1413 the second timer T304 with the second T304 timer value at a time later than starting the first timer T304 with the first T304 timer value. In one example as shown in FIG. 14A, the UE 102 starts 1406 the first timer T304 and performs 1408 the first random access procedure upon receiving the handover command. The UE 102 starts the second timer T304 with the second T304 timer value after completing the first random access procedure. Because the UE 102 starts the second timer T304 later than the first timer T304, the UE 102 can complete the second random access procedure before the second timer T304 expires regardless of whether the second T304 timer value is larger than the first T304 timer value. Thus, the UE 102 can complete the handover and the PSCell change configured by the handover command to avoid having to perform time consuming RRC reconfiguration procedures and measurement report procedures.

Figure 14B:
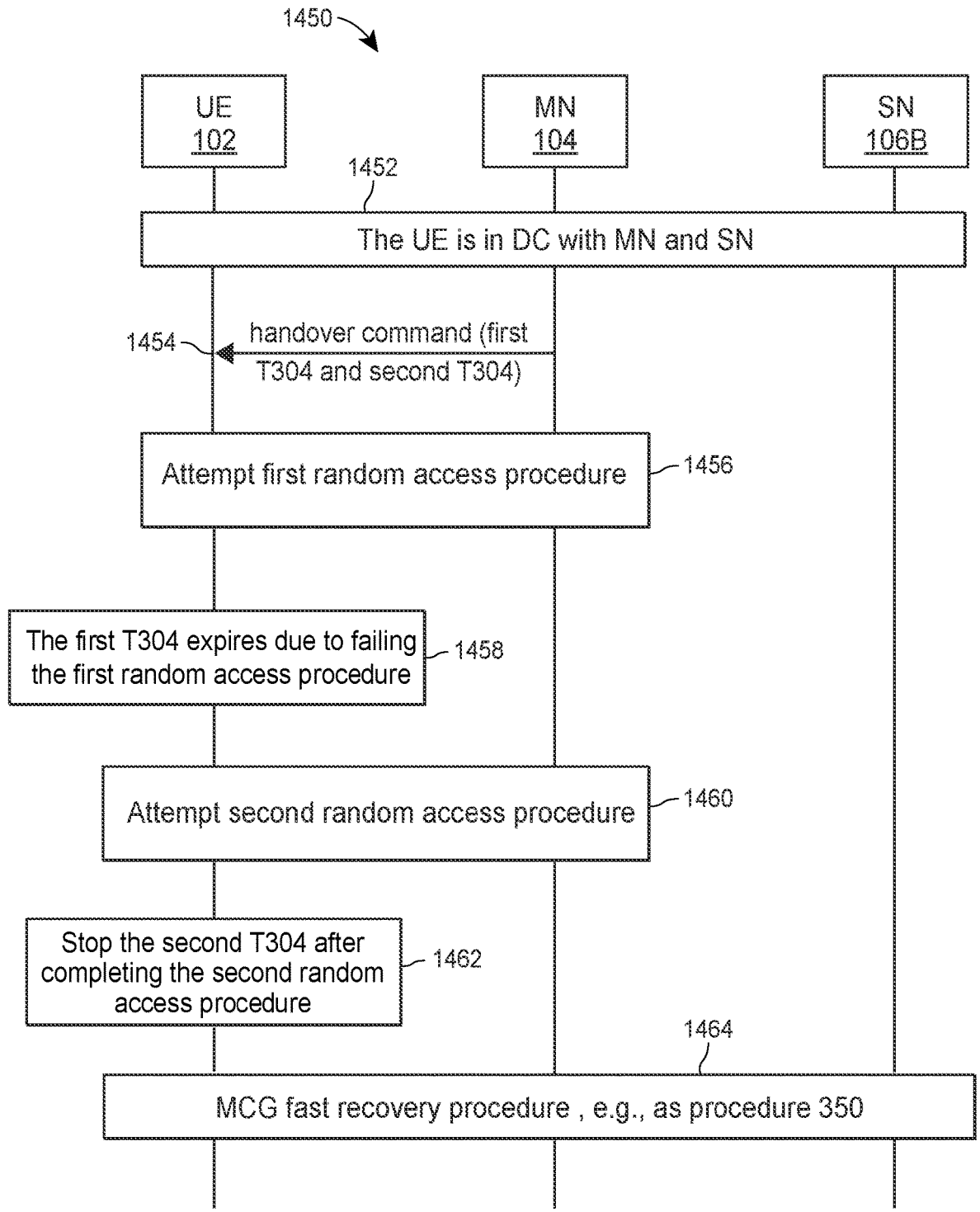
FIG. 14B is a messaging diagram of an example scenario in which a UE receives a handover command from an MN including a first timer value and a second timer value for first and second timers, respectively, for a first random access procedure on a PCell configured by the handover command and a second random access procedure on a PSCell configured by the handover command, where the first timer expires before completing the first random access procedure, the second random access procedure is completed, and the UE, the MN, and an SN perform a known procedure for fast recovery of an MCG link.

FIG. 14B illustrates a scenario 1450 in which the base station 104 operates as an MN, and the base station 106B operates as a SN. As with FIGS. 13 and 14A, FIG. 14B is similar to FIG. 12 in that the MN 104 transmits 1454 a handover command to the UE 102 which includes a first T304 timer value and a second T304 timer value. The second T304 timer value may be longer than the first T304 timer value as in the example scenario described with reference to FIG. 12, the UE 102 may perform the first and second random access procedures simultaneously as in the example scenario described with reference to FIG. 13, or the UE 102 may start the second timer T304 after the first timer T304 as in the example scenario described with reference to FIG. 14A.

In any event, the UE performs 1456 the first random access procedure upon receiving the handover command. Then the first timer T304 expires 1458 due to failing the first random access procedure. The UE 102 also performs (or keeps performing) 1460 the second random access procedure with the SN 106B as the first timer T304 expires. The UE 102 stops 1462 the second T304 timer in response to completing the second random access procedure. Then the UE 102 performs 1464 the MCG fast recovery procedure 350 instead of disconnecting from the SN 106B and performing an RRC reestablishment procedure. Thus, the UE 102 can recover a connection with the MN 104 through a connection with the SN 106B to avoid having to perform time consuming RRC reconfiguration procedures and measurement report procedures.

Figure 15:
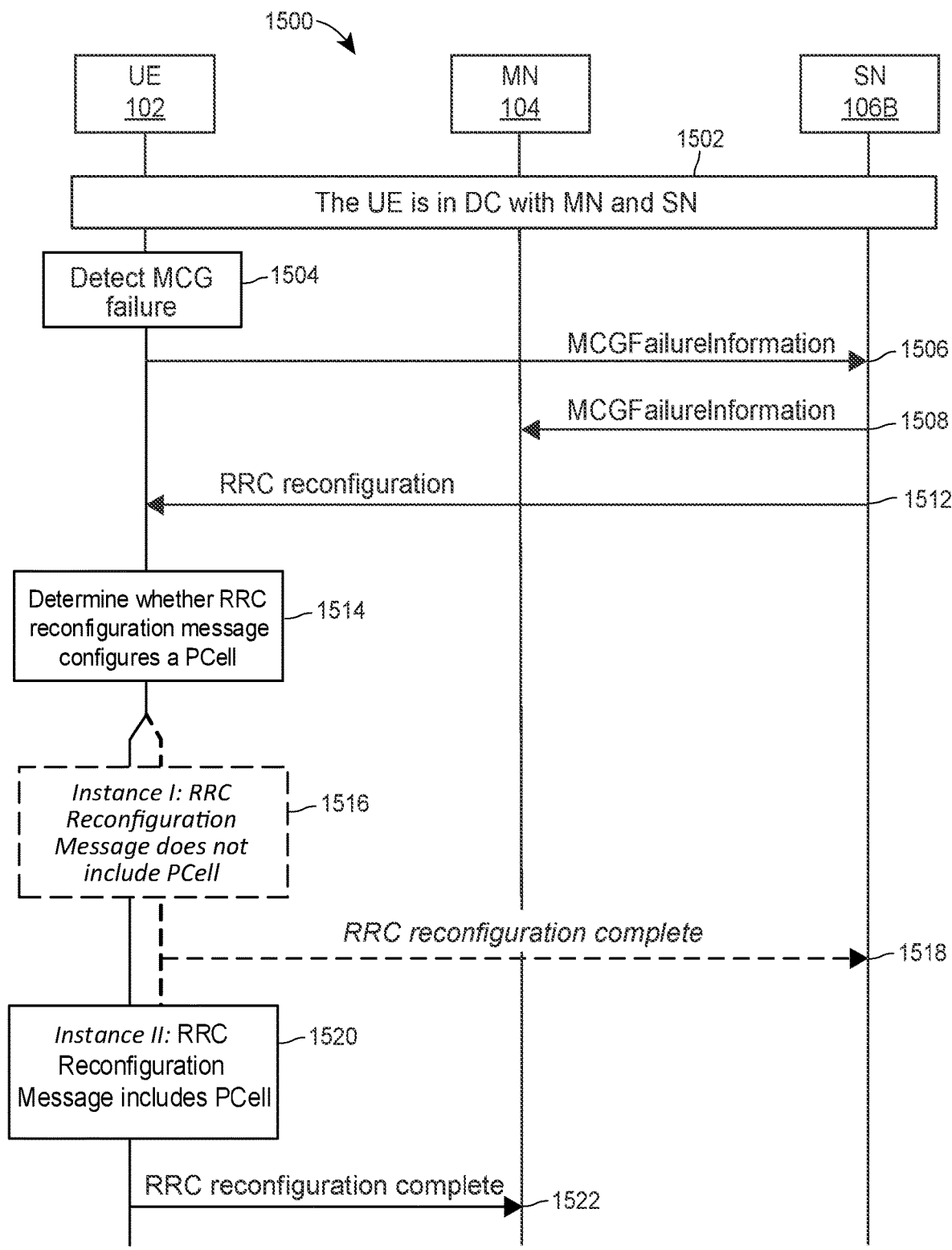
FIG. 15 is a messaging diagram of an example scenario in which a UE detects a MCG radio link failure, transmits an MCGFailureInformation message to an SN, receives an RRC message from an SN, and determines whether the RRC message configures a PCell belonging to an MN.

FIG. 15 illustrates a scenario 1500 in which the base station 104 operates as an MN, and the base station 106B operates as a SN. The UE 102 is in DC 1502 with the MN 104 and the SN 106B. The UE 102 then detects 1504 an MCG failure. In response to detecting the MCG failure 1504, the UE 102 transmits 1506 a MCGFailureInformation message to the SN 106B. The SN 106B sends 1508 the MCGFailureInformation message to the MN 104. The UE 102 receives 1512 an RRC reconfiguration message from the SN 106B after transmitting the MCGFailureInformation message. The UE 102 may determine 1514 whether the RRC reconfiguration message configures a PCell belonging to the MN 104. If the RRC reconfiguration message does not configure 1516 a PCell, the UE 102 transmits 1518 an RRC reconfiguration complete message to the SN 104 in response to the RRC reconfiguration message. If the RRC reconfiguration message configures 1520 a PCell belonging to the MN 104, the UE 102 transmits 1522 an RRC reconfiguration complete message to the MN 104 in response to the RRC reconfiguration message.

In some implementations, the MCG failure can be an MCG radio link failure, a handover failure, an MCG reconfiguration with sync failure, an integrity failure on an RRC message received from the MN 104, or a reconfiguration failure on a RRC message received from the MN 104.

In some implementations, the RRC reconfiguration message may include a ReconfigurationWithSync IE configuring a PCell. In other implementations, the RRC reconfiguration message may include a MobilityControlInfo IE configuring a PCell. In this case, the UE 102 transmits the RRC reconfiguration complete message on the PCell.

In some implementations, the RRC reconfiguration message may configure a PCell belonging to a new MN (not shown in FIG. 15). In this case, the UE 102 transmits the RRC reconfiguration complete message on the PCell to the new MN instead of the MN 104.

If the RRC reconfiguration message configures a PCell, the RRC reconfiguration message in some implementations may include one or more configurations for the UE 102 to perform a random access procedure on the PCell. The UE 102 performs a random access procedure on the PCell according to the one or more configurations. The UE 102 transmits the RRC reconfiguration complete message on the PCell in the random access procedure or after the random access procedure.

In some implementations, the RRC reconfiguration message may be generated by the MN 104, SN 106B or a new MN. In some implementations, the RRC reconfiguration message 1512 may be associated with the SRB1 or SRB3. That is, the UE 102 may receive the RRC reconfiguration message 1512 on the SRB1 or SRB3. In case of the SRB1, the MN 104 in one implementation may generate the RRC reconfiguration message, generate a packet data convergence protocol (PDCP) protocol data unit (PDU) including the RRC reconfiguration message, and transmit the PDCP PDU to the SN 106B. The SN 106B in turn sends the PDCP PDU to the UE 102. The MN 104 in another implementation may include the RRC reconfiguration message in a DL-DCCH-Message message, generate a PDCP PDU including the DL-DCCH-Message message and transmit the PDCP PDU to the SN 106B. The SN 106B in turn sends the PDCP PDU to the UE 102.

When the RRC reconfiguration message is associated with the SRB1, the new MN in another implementation may generate the RRC reconfiguration message and send the RRC reconfiguration message to the MN 104, e.g. in a Handover Request Acknowledge message responding to a Handover Request message received by the new MN from the MN 104. Then the MN 104 in one implementation may generate a packet data convergence protocol (PDCP) protocol data unit (PDU) including the RRC reconfiguration message and send the PDCP PDU to the SN 106B. The SN 106B in turn transmits the PDCP PDU to the UE 102. The MN 104 in another implementation may include the RRC reconfiguration message in a DL-DCCH-Message message, generate a PDCP PDU including the DL-DCCH-Message and transmit the PDCP PDU to the SN 106B. The SN 106B in turn sends the PDCP PDU to the UE 102.

When the RRC reconfiguration message is associated with the SRB3, the MN 104 in one implementation may generate the RRC reconfiguration message and send the RRC reconfiguration message to the SN 106B. The SN 106B includes the RRC reconfiguration message in an RRC container message and generates a PDCP PDU including the RRC container message. Then the SN 106B sends the PDCP PDU to the UE 102. The MN 104 in another implementation may include the RRC reconfiguration message in a DL-DCCH-Message message and send the DL-DCCH-Message message to the SN 106B. The SN 106B includes the DL-DCCH-Message message in an RRC container message and generates a PDCP PDU including the RRC container message. Then the SN 106B sends the PDCP PDU to the UE 102. In these implementations, the RRC container message can be a DLInformationTransferMRDC message.

When the RRC reconfiguration message is associated with the SRB3, the new MN in one implementation may generate the RRC reconfiguration message and send the RRC reconfiguration message to the MN 104, e.g. in a Handover Request Acknowledge message responding to a Handover Request message received by the new MN from the MN 104. Then the MN 104 may send the RRC reconfiguration message to the SN 106B. The SN 106B includes the RRC reconfiguration message in an RRC container message and generates a PDCP PDU including the RRC container message. Then the SN 106B sends the PDCP PDU to the UE 102. The MN 104 in another implementation may include the RRC reconfiguration message in a DL-DCCH-Message message and send the DL-DCCH-Message message to the SN 106B. The SN 106B includes the DL-DCCH-Message message in an RRC container message and generates a PDCP PDU including the RRC container message. Then the SN 106B sends the PDCP PDU to the UE 102. In these implementations, the RRC container message can be a DLInformationTransferMRDC message.

When the RRC reconfiguration message is associated with the SRB3, the SN 106B in another implementation may generate the RRC reconfiguration message, generate a PDCP PDU including the RRC configuration message and send the PDCP PDU to the UE 102.

Figure 16:
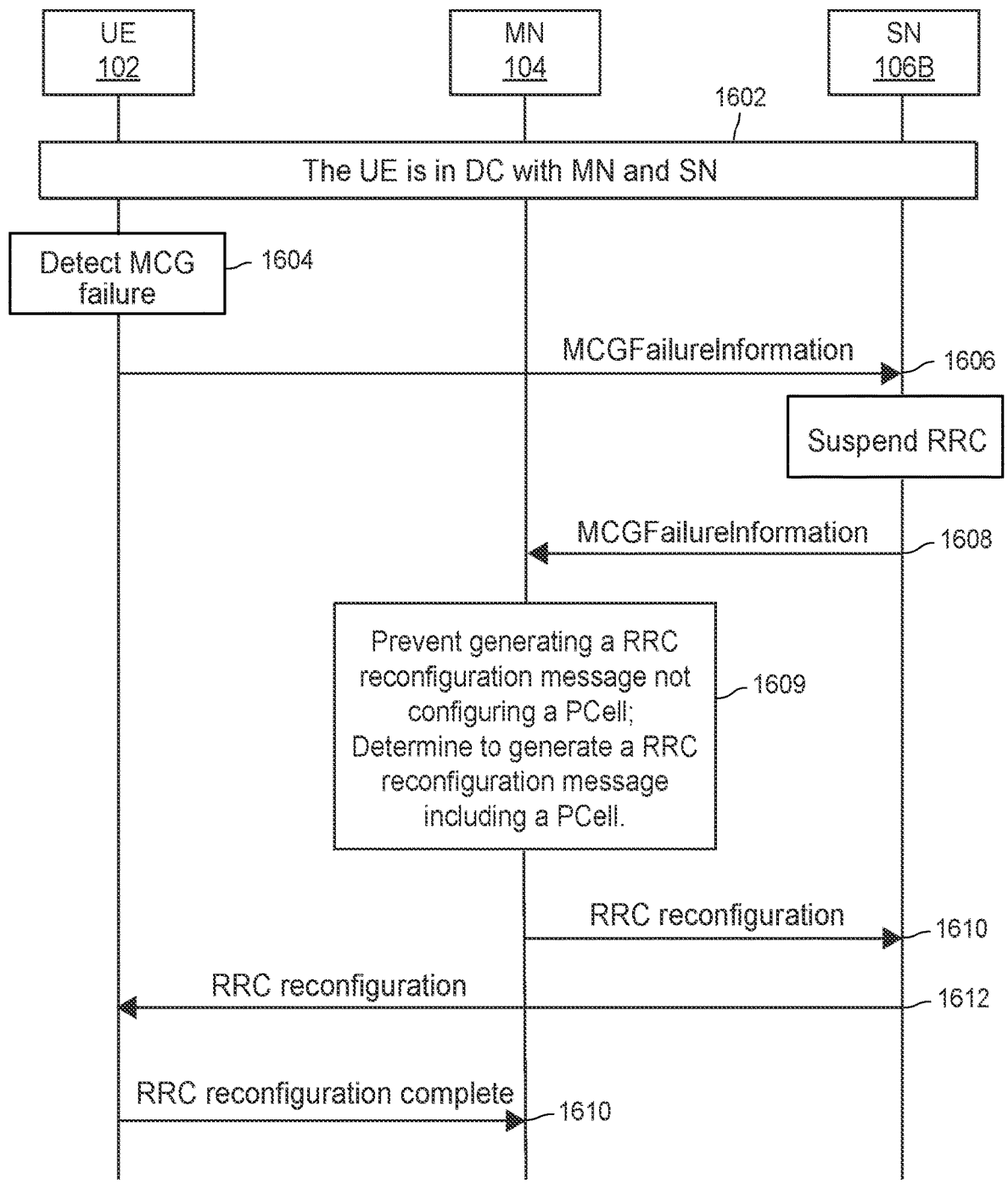
FIG. 16 is a messaging diagram of an example scenario in which a UE detects a MCG radio link failure, and transmits an MCGFailureInformation message to an SN, and an MN generates an RRC message configuring a PCell belonging to the MN.

FIG. 16 illustrates a scenario 1600 in which the base station 104 operates as an MN, and the base station 106B operates as a SN. FIG. 16 is similar to FIG. 15 in that the UE 102 detects 1604 an MCG failure, in response to detecting the MCG failure 1604, the UE 102 transmits 1606 an MCGFailureInformation message to the SN 106B, the SN 106B sends 1608 the MCGFailureInformation message to the MN 104, and the UE 102 receives 1612 an RRC reconfiguration message from the SN 106B after transmitting the MCGFailureInformation message.

Additionally, the SN 106B may suspend 1607 its RRC function in response to the MCGFailureInformation message 1606. While the SN 106B suspends the RRC function 1607, the SN 106B does not generate an RRC reconfiguration message to configure or reconfigure SN radio resources to the UE 102. The MN 104 may not generate 1609 an RRC reconfiguration message that does not configure a PCell in response to the MCGFailureInformation message 1608. Instead, the MN 104 generates 1609 an RRC reconfiguration message configuring a PCell and sends the RRC reconfiguration message to the SN 106B in response to the MCGFailureInformation message 1608. Then the SN 106B transmits 1612 the RRC reconfiguration message to the UE 102 which includes a PCell. The UE 102 then transmits 1616 an RRC reconfiguration complete message in response to the RRC reconfiguration message. Given that the SN 106B suspends the RRC function and the MN 104 does not generate an RRC reconfiguration message that does not configure a PCell, the UE 102 only needs to handle an RRC reconfiguration message configuring a PCell. Therefore, the UE 102 transmits an RRC reconfiguration complete message on the PCell to the MN 104. As described with reference to FIG. 15, the UE 102 can transmit the RRC reconfiguration complete message on the PCell to a new MN instead of the MN 104 if the PCell belongs to the new MN.

Figure 17A:
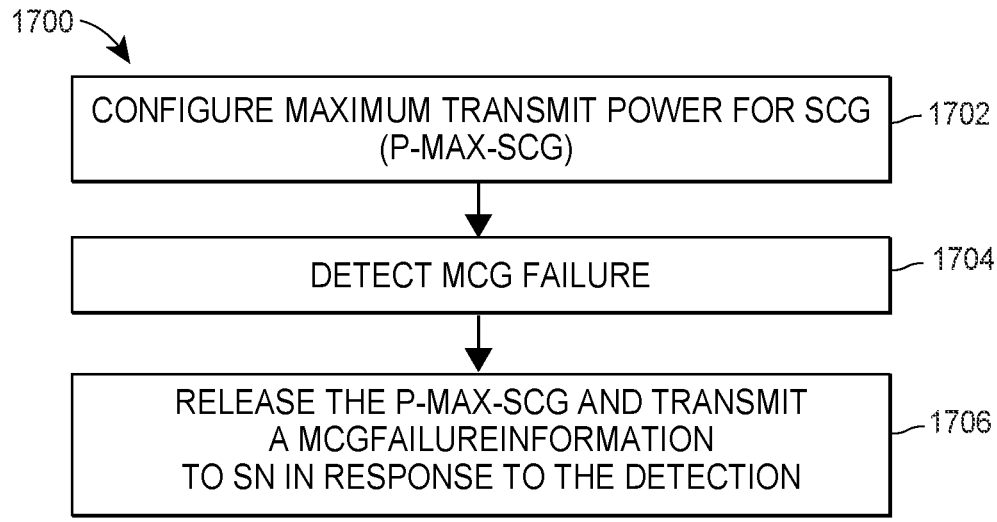
FIG. 17A is a flow diagram of an example method that includes releasing a maximum transmit power configuration for SCG (P-Max-SCG) subsequent to detecting an MCG radio link failure, which can be implemented in the UE of FIG. 1.

FIG. 17A is a flow diagram depicting an example method 1700 implemented in a UE (e.g., UE 102) for releasing a maximum transmit power configuration for SCG (P-Max-SCG). For convenience, the method 1700 is discussed below with reference to the MN 104, the SN 106B and the UE 102, operating in the wireless communication system 100.

At block 1702, the UE 102 in DC with the MN 104 and the SN 106B is configured with a maximum transmit power for SCG (P-Max-SCG). At block 1704, the UE 102 detects an MCG failure. In response to detecting the MCG failure, at block 1706, the UE 102 releases the P-Max-SCG and transmits a MCGFailureInformation message to the SN 106B with a transmit power that exceeds the P-Max-SCG.

Figure 17B:
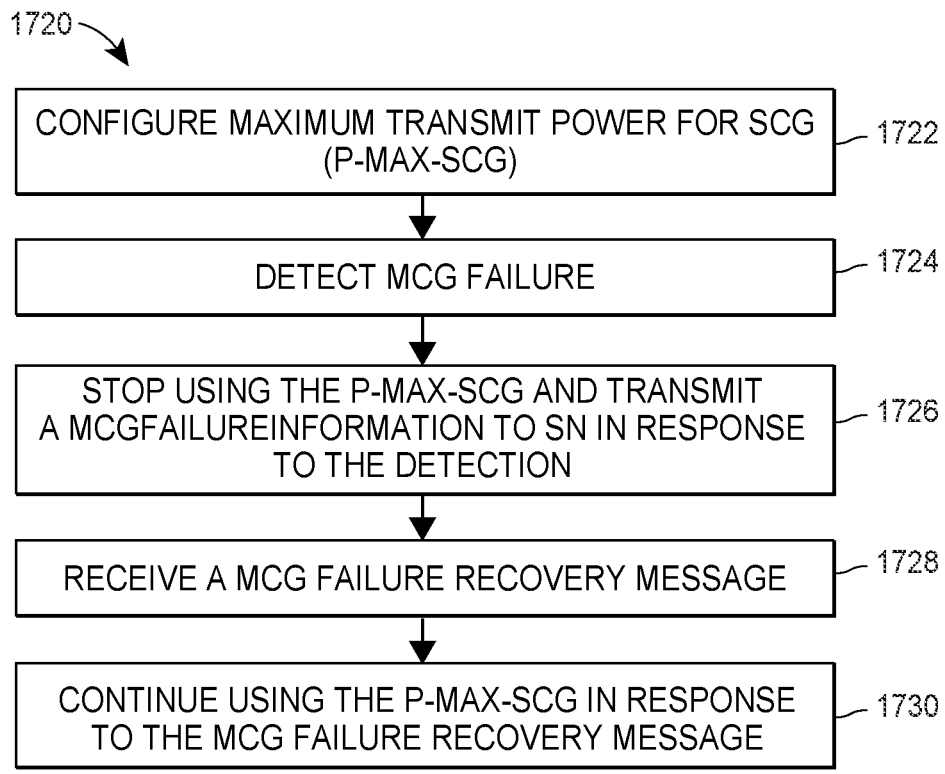
FIG. 17B is another flow diagram of an example method that includes no longer using a maximum transmit power configuration for SCG (P-Max-SCG) subsequent to detecting an MCG radio link failure, which can be implemented in the UE of FIG. 1.

FIG. 17B is a flow diagram depicting an example method 1720 implemented in a UE (e.g., UE 102) for removing a maximum transmit power configuration requirement for SCG (P-Max-SCG). For convenience, the method 1720 is discussed below with reference to the MN 104, the SN 106B and the UE 102, operating in the wireless communication system 100.

At block 1722, the UE 102 in DC with the MN 104 and the SN 106B is configured with a maximum transmit power for SCG (P-Max-SCG). At block 1724, the UE 102 detects an MCG failure. In response to detecting the MCG failure, at block 1726, the UE 102 stops (or suspends) using the P-Max-SCG as the maximum transmit power for the SCG and transmits a MCGFailureInformation message to the SN 106B. At block 1728, the UE 102 receives an MCG recovery message from the SN 106B. Then at block 1730, the UE 102 continues (or resumes) using the P-Max-SCG in response to the MCG recovery message.

Figure 17C:
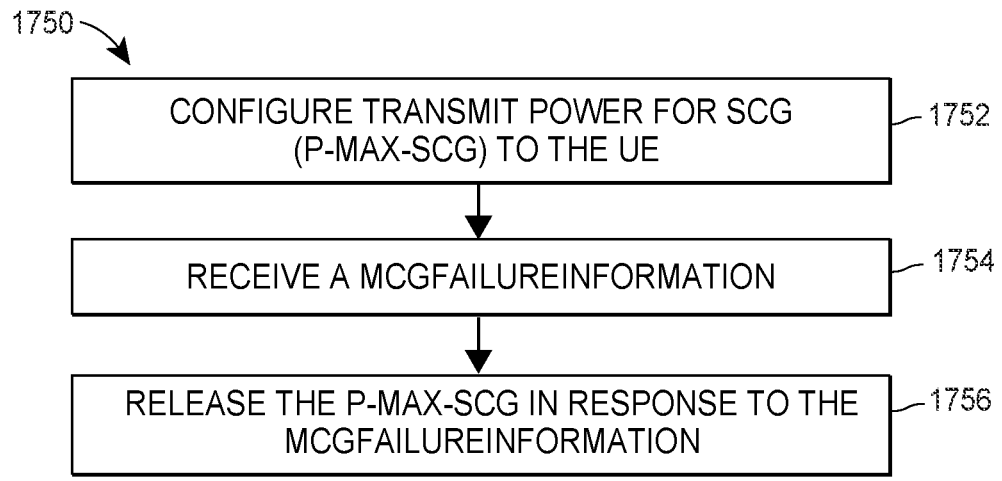
FIG. 17C is a flow diagram of an example method that includes releasing a maximum transmit power configuration for SCG (P-Max-SCG) subsequent to detecting an MCG radio link failure, which can be implemented in the MN or SN of FIG. 1.

FIG. 17C is a flow diagram depicting an example method 1750 implemented in a MN (e.g., MN 104) or a SN (e.g., SN 106) for releasing a maximum transmit power configuration for SCG (P-Max-SCG). For convenience, the method 1750 is discussed below with reference to the MN 104, the SN 106B and the UE 102, operating in the wireless communication system 100.

At block 1752, the MN 104 or the SN 106B configures a maximum transmit power for SCG (P-Max-SCG) for the UE 102 in DC with the MN 104 and the SN 106B. At block 1754, the MN 104 or the SN 106B receives an MCGFailureInformation message from the UE 102. Then at block 1756, the MN 104 or the SN 106B releases the P-Max-SCG from being the maximum transmit power for the UE 102 to transmit to the SCG in response to receiving the MCGFailureInformation message.

Figure 17D:
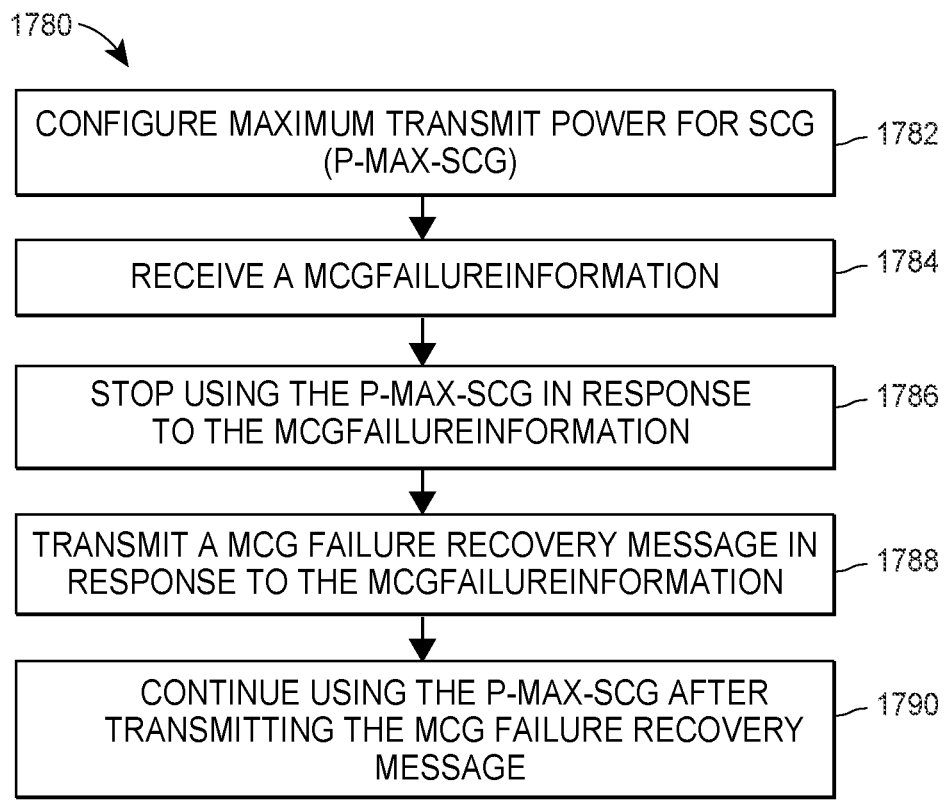
FIG. 17D is another flow diagram of an example method that includes no longer using a maximum transmit power configuration for SCG (P-Max-SCG) subsequent to detecting an MCG radio link failure, which can be implemented in the MN or SN of FIG. 1.

FIG. 17D is a flow diagram depicting an example method 1780 implemented in an MN (e.g., MN 104) or an SN (e.g., SN 106) for removing a maximum transmit power configuration requirement for SCG (P-Max-SCG). For convenience, the method 1780 is discussed below with reference to the MN 104, the SN 106B and the UE 102, operating in the wireless communication system 100.

At block 1782, the MN 104 or the SN 106B configures a maximum transmit power for SCG (P-Max-SCG) for the UE 102 in DC with the MN 104 and the SN 106B. At block 1784, the MN 104 or the SN 106B receives the MCGFailureInformation message from the UE 102. In response to receiving the MCGFailureInformation message, at block 1786, the MN 104 or the SN 106B stops (or suspends) using the P-Max-SCG as the maximum transmit power for the SCG. At block 1788, the MN 104 or the SN 106B transmits an MCG failure recovery message to the UE 102 in response to the MCGFailureInformation message. At block 1790, the MN 104 or the SN 106B continues (or resumes) using the P-Max-SCG as the maximum transmit power for the SCG after transmitting the MCG failure recovery message to the UE 102.

Figure 18A:
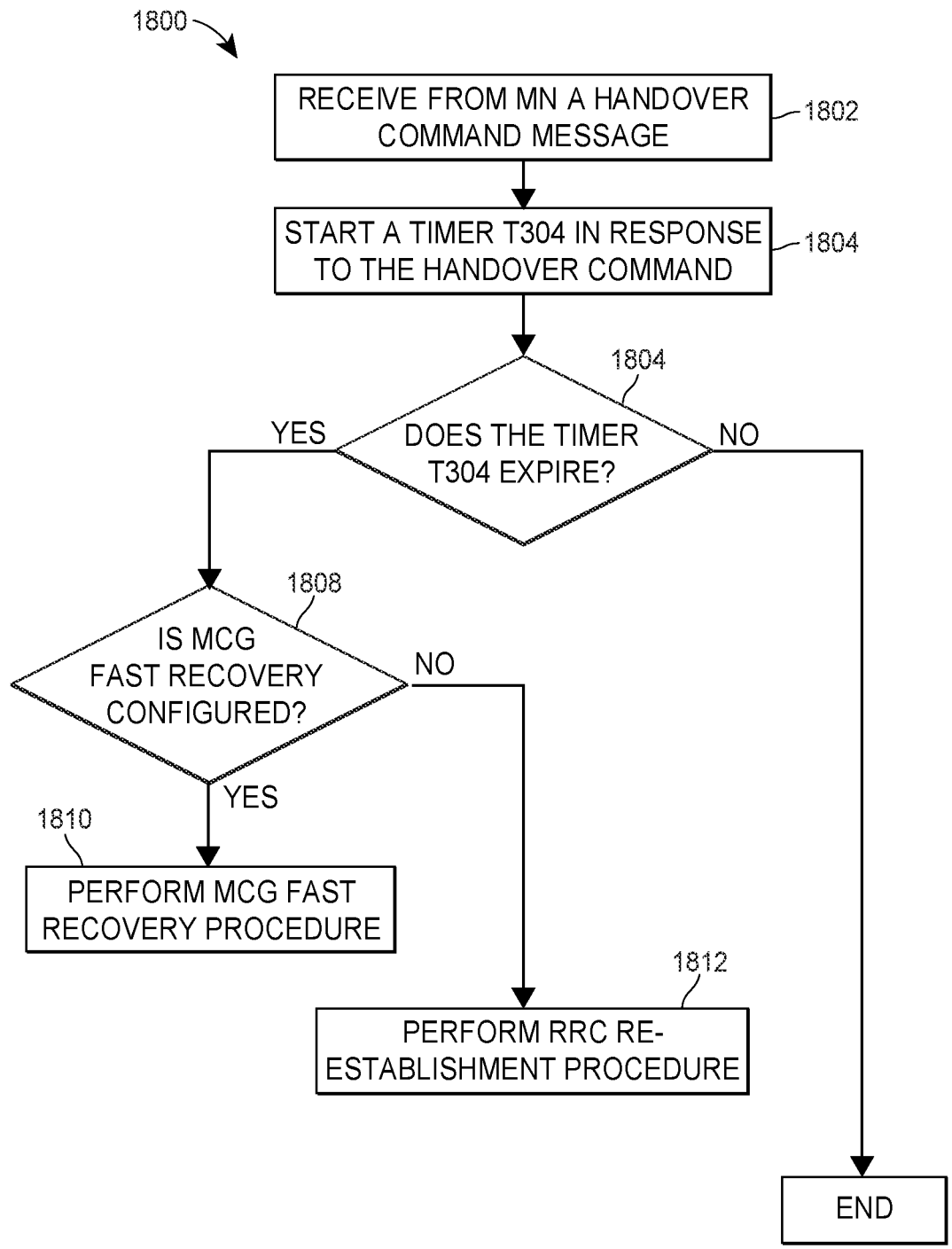
FIG. 18A is a flow diagram of an example method for handling a handover-related timer expiry during a handover procedure, which can be implemented in the UE of FIG. 1.

FIG. 18A is a flow diagram depicting an example method 1800 implemented in a UE (e.g., UE 102) for handling a handover-related timer (e.g., timer T304 for MCG) expiry during a handover procedure. For convenience, the method 1800 is discussed below with reference to the MN 104, the SN 106B and the UE 102, operating in the wireless communication system 100.

At block 1802, the UE 102 in DC with the MN 104 and the SN 106B receives a handover command from the MN 104. At block 1804, the UE 102 starts a timer T304 in response to the handover command. At block 1806, the UE 102 determines whether the timer T304 expires. If the timer T304 expires, the UE 102 determines 1808 whether the MCG fast recovery is configured by the MN 104. If the MCG fast recovery is configured, the UE 102 performs 1810 an MCG fast recovery procedure. If the MCG fast recovery is not configured, the UE 102 performs 1812 an RRC re-establishment procedure.

Figure 18B:
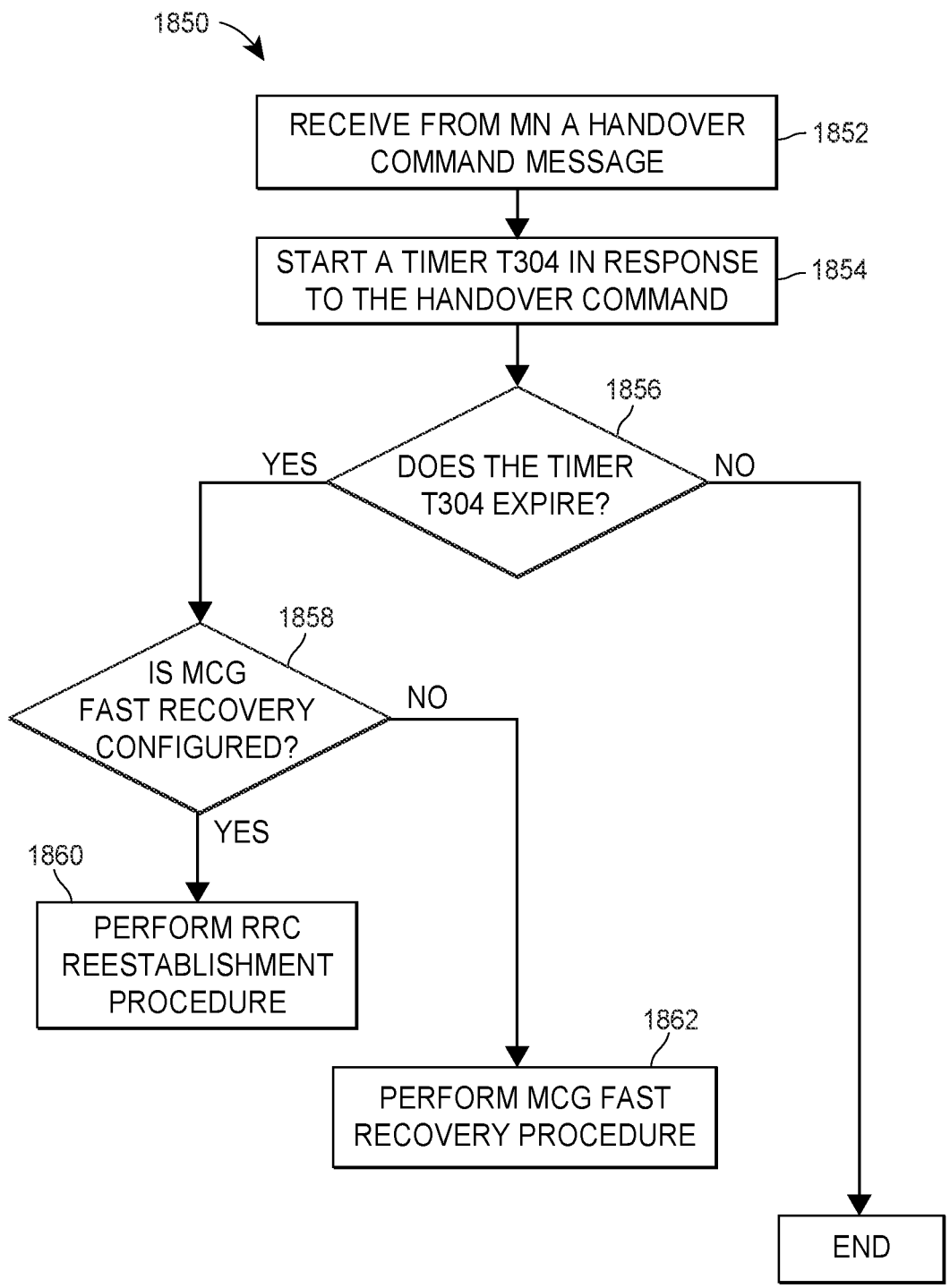
FIG. 18B is another flow diagram of an example method for handling a handover-related timer expiry during a handover procedure, which can be implemented in the UE of FIG. 1.

FIG. 18B is a flow diagram depicting another example method 1850 implemented in a UE (e.g., UE 102) for handling a handover-related timer (e.g., timer T304 for MCG) expiry during a handover procedure. For convenience, the method 1500 is discussed below with reference to the MN 104, the SN 106B and the UE 102, operating in the wireless communication system 100.

At block 1852, the UE 102 in DC with the MN 104 and the SN 106B receives a handover command from the MN 104. At block 1854, the UE 102 starts a timer T304 in response to the handover command. At block 1856, the UE 102 determines whether the timer T304 expires. If the timer T304 expires, the UE 102 determines 1858 whether the handover command is to recover an MCG failure. If the handover command is to recover an MCG failure, the UE 102 performs 1860 an RRC re-establishment procedure. If the handover command is not to recover an MCG failure, the UE 102 performs 1862 an MCG fast recovery procedure.

Figure 19:
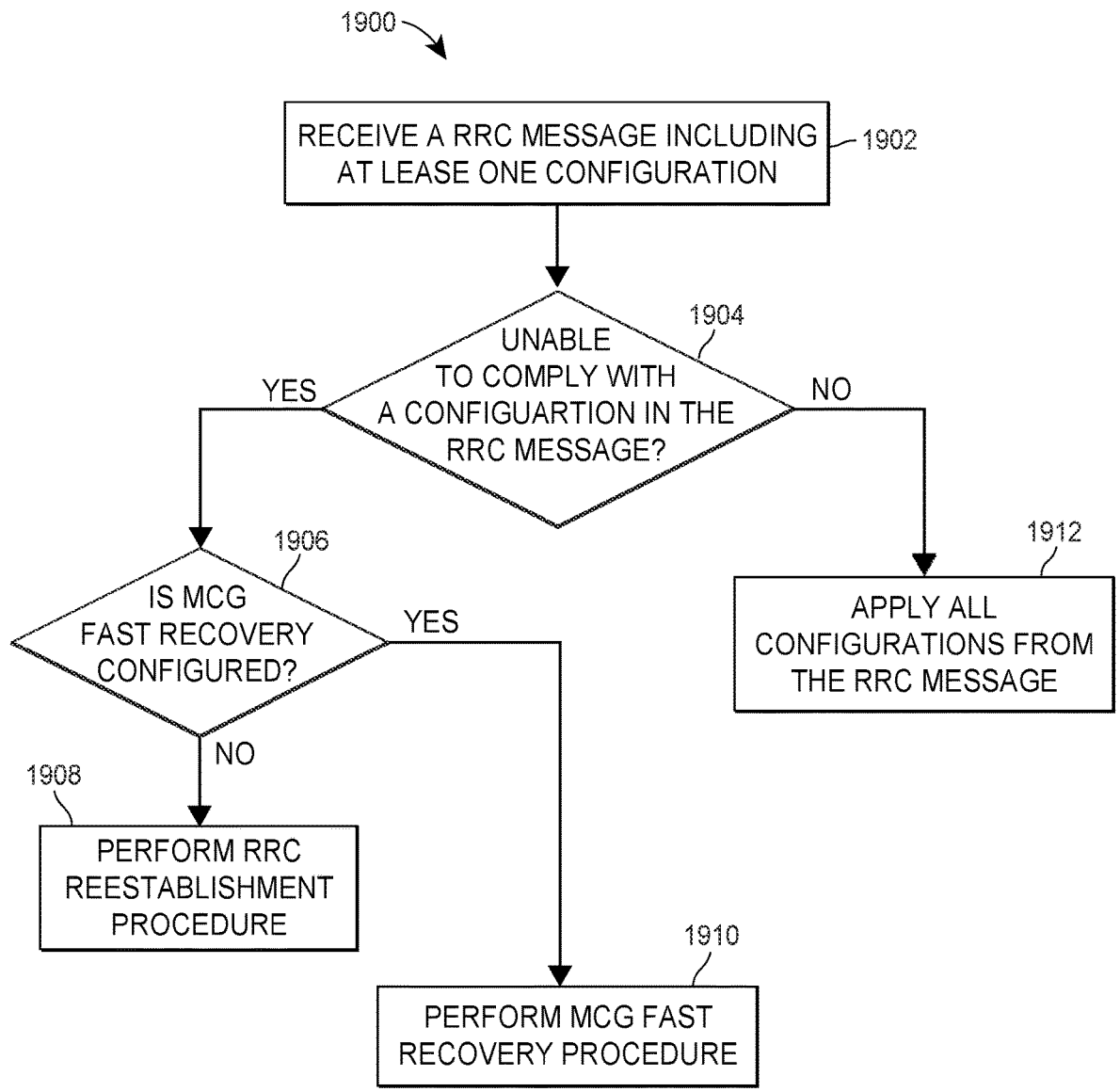
FIG. 19 is a flow diagram of an example method for handling a configuration from an RRC message, which can be implemented in the UE of FIG. 1.

FIG. 19 is a flow diagram depicting an example method 1900 implemented in a UE (e.g., UE 102) for handling a configuration from receiving an RRC message (e.g., an RRCReconfiguraion message). For convenience, the method 1900 is discussed below with reference to the MN 104, the SN 106B and the UE 102, operating in the wireless communication system 100.

At block 1902, the UE 102 in DC with the MN 104 and the SN 106B receives an RRC message including at least one configuration from the MN 104. At block 1904, the UE 102 determines whether it unable to comply with at least one configuration in the receiving RRC message. If the UE 102 is unable to comply with a configuration (i.e., the UE 102 detects reconfiguration failure), the UE 102 determines 1906 whether the MCG fast recovery is configured by the MN 104. If the MCG fast recovery is configured, the UE 102 performs 1910 an MCG fast recovery procedure. If the MCG fast recovery is not configured, the UE 102 performs 1908 an RRC re-establishment procedure. If the UE is able to comply with all configurations, the UE 1912 applies the configurations from the RRC message.

Figure 20A:
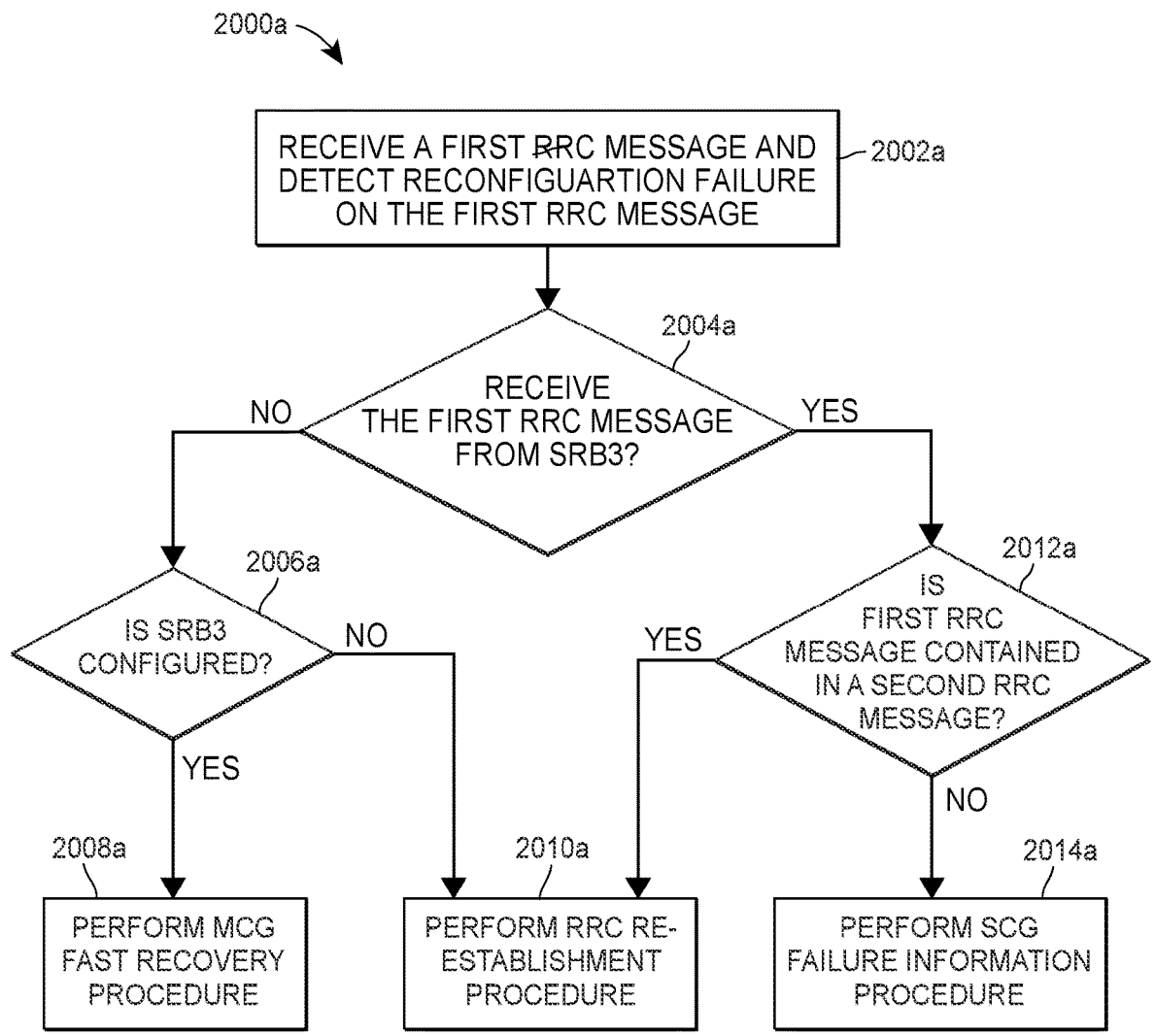
FIG. 20A is a flow diagram of an example method for handling a configuration failure from an RRC message, which can be implemented in the UE of FIG. 1.

FIG. 20A is a flow diagram depicting an example method 2000a implemented in a UE (e.g., UE 102) for handling a reconfiguration failure from receiving an RRC message (e.g., an RRCReconfiguration message). For convenience, the method 2000a is discussed below with reference to the MN 104, the SN 106B and the UE 102, operating in the wireless communication system 100.

At block 2002a, the UE 102 in DC with the MN 104 and the SN 106B receives a first RRC message from the MN 104 or the SN 106B and detects a reconfiguration failure on the first RRC message. At block 2004a, the UE 102 determines whether the first RRC message is received from the SRB3. If the first RRC message is not received from the SRB3, the UE 102 determines 2006a whether the SRB3 is configured. If the SRB3 is configured, the UE 102 performs 2008a an MCG fast recovery procedure 350. If the SRB3 is not configured, the UE 102 performs 2010a an RRC re-establishment procedure.

If the first RRC message is received from the SRB3, the UE 102 determines 2012a whether the first RRC message is included in a second RRC message. If the first RRC message is included in a second RRC message (e.g., an DLInformationTransferMRDC message), the UE 102 performs 2010a an RRC re-establishment procedure. If the first RRC message is not included in a second RRC message, the UE 102 performs 2014a an SCG Failure Information procedure (i.e., the UE 102 transmits a SCGFailureInformation message to the MN 104).

To perform the MCG fast recovery procedure, the UE 102 in one implementation includes the MCGFailureInformation message in an ULInformationTransferMRDC message and transmits the ULInformationTransferMRDC message via the SRB3 if the SRB3 is configured. To perform the RRC re-establishment procedure, the UE 102 transmits an RRC re-establishment request message to the MN 104 or a new MN. The UE 102 may receive an RRC re-establishment message responding to the RRC re-establishment request message from the MN 104 or the new MN.

Figure 20B:
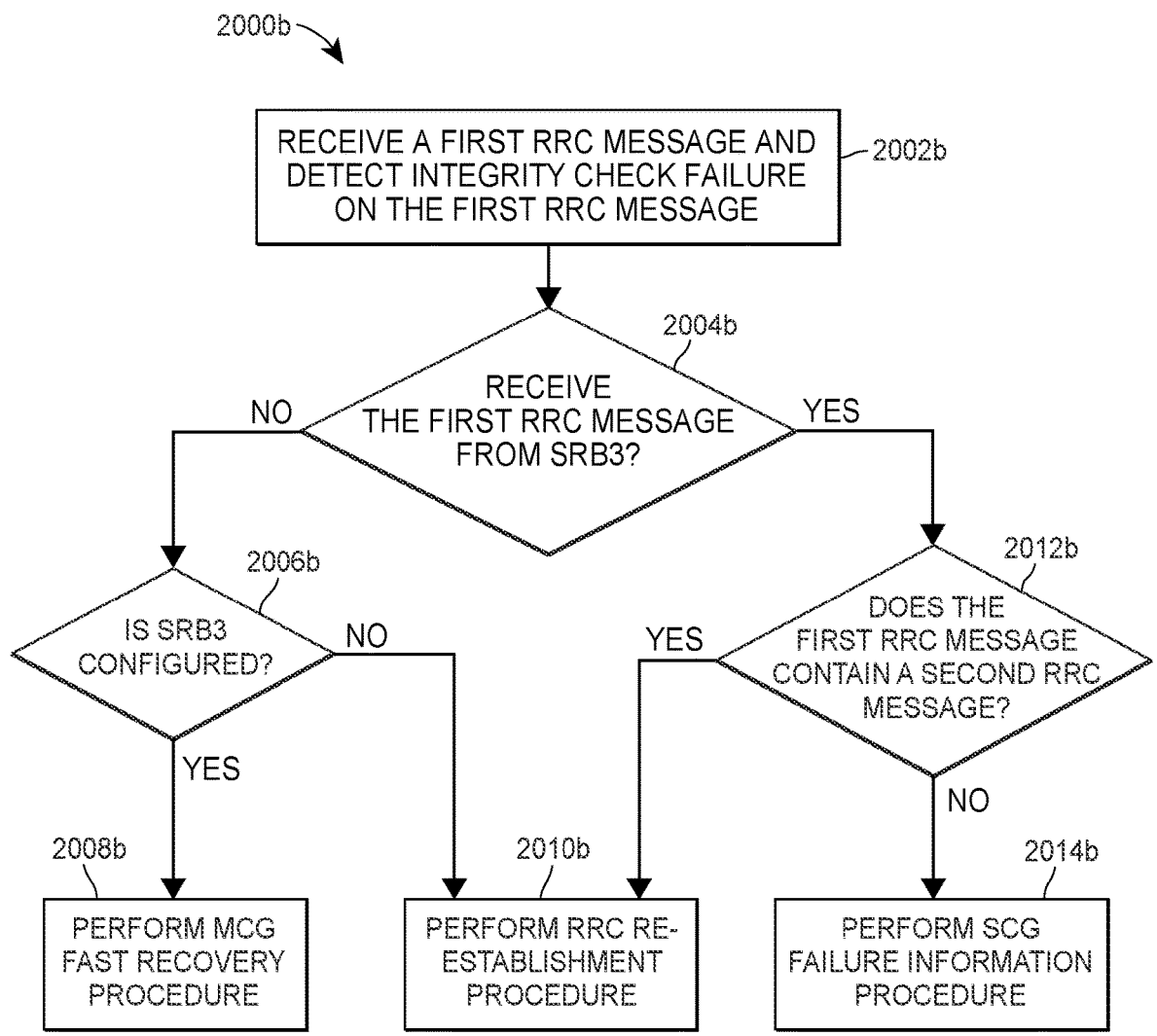
FIG. 20B is a flow diagram of an example method for handling an integrity check failure from an RRC message, which can be implemented in the UE of FIG. 1.

FIG. 20B is a flow diagram depicting an example method 2000b implemented in a UE (e.g., UE 102) for handling an integrity check failure from receiving an RRC message (e.g., an RRCReconfiguraion message). For convenience, the method 2000b is discussed below with reference to the MN 104, the SN 106B and the UE 102, operating in the wireless communication system 100.

At block 2002b, the UE 102 in DC with the MN 104 and the SN 106B receives a first RRC message from the MN 104 or the SN 106B and detects an integrity check failure on the first RRC message. At block 2004b, the UE 102 determines whether the first RRC message is received from the SRB3. If the first RRC message is not received from the SRB3, the UE 102 determines 2006b whether the SRB3 is configured. If the SRB3 is configured, the UE 102 performs 2008b an MCG fast recovery procedure. If the SRB3 is not configured, the UE 102 performs 2010b an RRC re-establishment procedure.

If the first RRC message is received from the SRB3, the UE 102 determines 2012b whether the first RRC message (e.g., an DLInformationTransferMRDC message) contains a second RRC message. If the first RRC message contains the second RRC message, the UE 102 performs 2010b an RRC re-establishment procedure. If the first RRC message does not contain the second RRC message, the UE 102 performs 2014b an SCG Failure Information procedure (e.g., the UE 102 transmits a SCGFailureInformation message to the MN 104).

To perform the MCG fast recovery procedure, the UE 102 in one implementation includes the MCGFailureInformation message in an ULInformationTransferMRDC message and transmits the ULInformationTransferMRDC message via the SRB3 if the SRB3 is configured. To perform the RRC re-establishment procedure, the UE 102 transmits an RRC re-establishment request message to the MN 104 or a new MN. The UE 102 may receive an RRC re-establishment message responding to the RRC re-establishment request message from the MN 104 or the new MN.

Figure 21A:
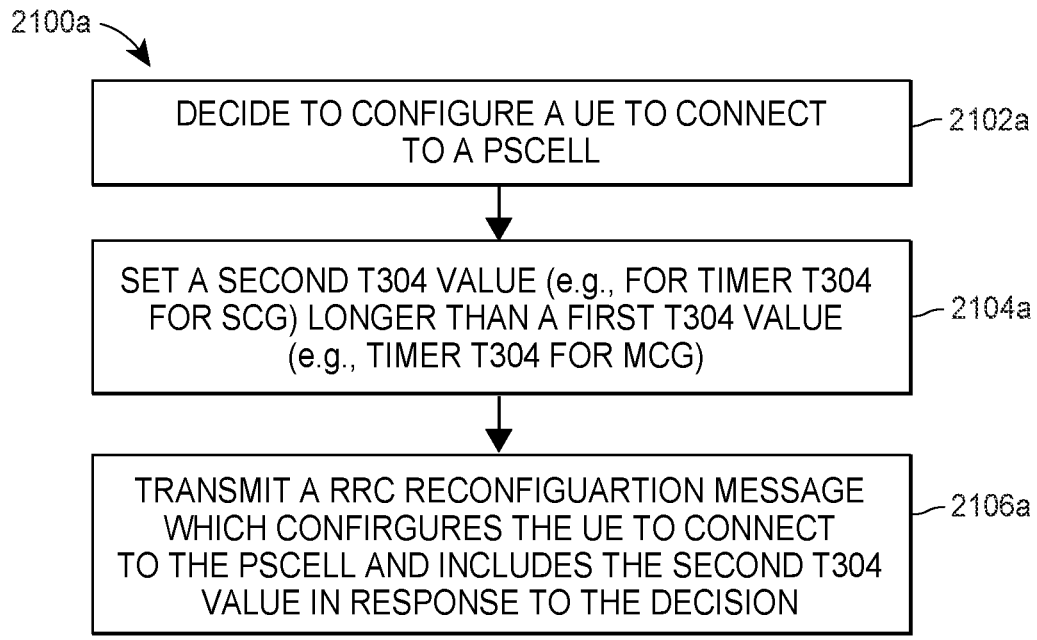
FIG. 21A is a flow diagram of an example method for handling a handover-related timer during a handover procedure, which can be implemented in the MN of FIG. 1.

FIG. 21A is a flow diagram depicting an example method 2100a implemented in an MN (e.g., MN 104) for handling a handover procedure (also referred to as a reconfiguration with sync procedure). For convenience, the method 2100a is discussed below with reference to the MN 104, the SN 106B and the UE 102, operating in the wireless communication system 100.

At block 2102a, the SN 106B decides to configure UE 102 to connect to a PSCell. In response to configuring the UE 102 to connect to a PSCell, the SN 106B sets 2104a a second T304 timer value (e.g., for a second timer T304 for SCG) which is longer than a first T304 timer value (e.g., for a first timer T304 for MCG). At block 2016a, the SN 106B transmits an RRC reconfiguration message to the UE 102 which configures the UE 102 to connect to the PSCell and includes the second T304 timer value.

Figure 21B:
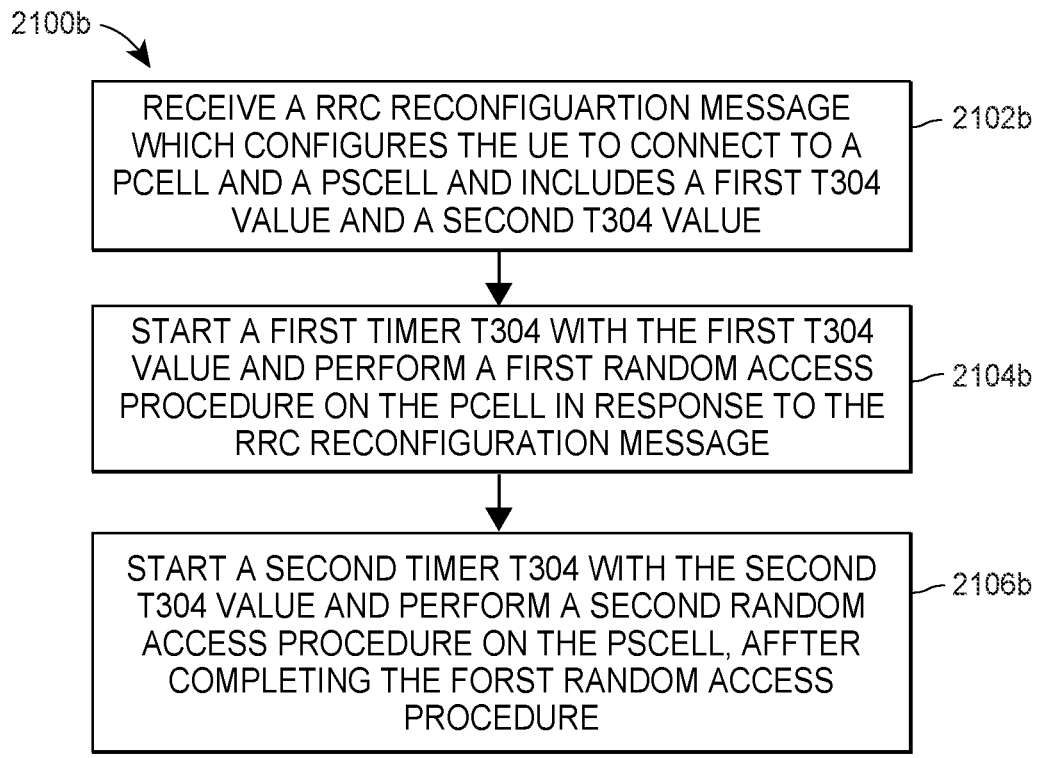
FIG. 21B is a flow diagram of an example method for handling a handover-related timer during a handover procedure, which can be implemented in the UE of FIG. 1.

FIG. 21B is a flow diagram depicting an example method 2100b implemented in a UE (e.g., UE 102) for handling a handover procedure (or called reconfiguration with sync procedure). For convenience, the method 2100b is discussed below with reference to the MN 104, the SN 106B and the UE 102, operating in the wireless communication system 100.

At block 2102b, the UE 102 receives an RRC reconfiguration message which configures the UE to connect to a PCell and a PSCell and includes a first T304 timer value (e.g., for a first timer T304 for MCG) and a second T304 timer value (e.g., for a second timer T304 for SCG).

In response to the RRC reconfiguration message, the UE 102 starts 2104b a first timer T304 with the first T304 timer value and performs a first random access procedure on the PCell. At block 2106b, the UE 102 starts a second timer T304 with the second T304 timer value and performs a second random access procedure on the PSCell after completing the first random access procedure (e.g., after successfully performing the first random access procedure on the PCell or failing to perform the first random access procedure on the PCell).

Figure 21C:
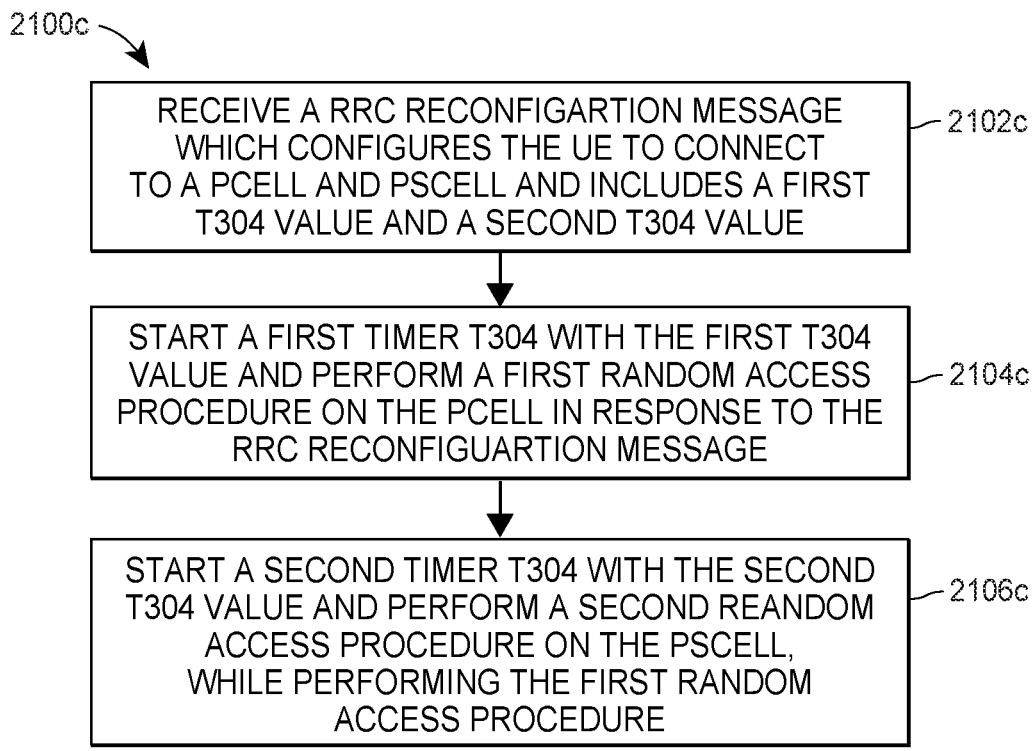
FIG. 21C is another flow diagram of an example method for handling a handover-related timer during a handover procedure, which can be implemented in the UE of FIG. 1.

FIG. 21C is a flow diagram depicting another example method 2100c implemented in a UE (e.g., MN 102) for handling a handover procedure (or called reconfiguration with sync procedure). For convenience, the method 2100c is discussed below with reference to the MN 104, the SN 106B and the UE 102, operating in the wireless communication system 100.

At block 2102c, the UE 102 receives an RRC reconfiguration message which configures the UE to connect to a PCell and a PSCell and includes a first T304 timer value (e.g., for a first timer T304 for MCG) and a second T304 timer value (e.g., for a second timer T304 for SCG).

In response to the RRC reconfiguration message, the UE 102 starts 2104c a first timer T304 with the first T304 timer value and performs a first random access procedure on the PCell. At block 2106c, the UE 102 starts a second timer T304 with the second T304 timer value and performs a second random access procedure on the PSCell while performing the first random access procedure.

Figure 21D:
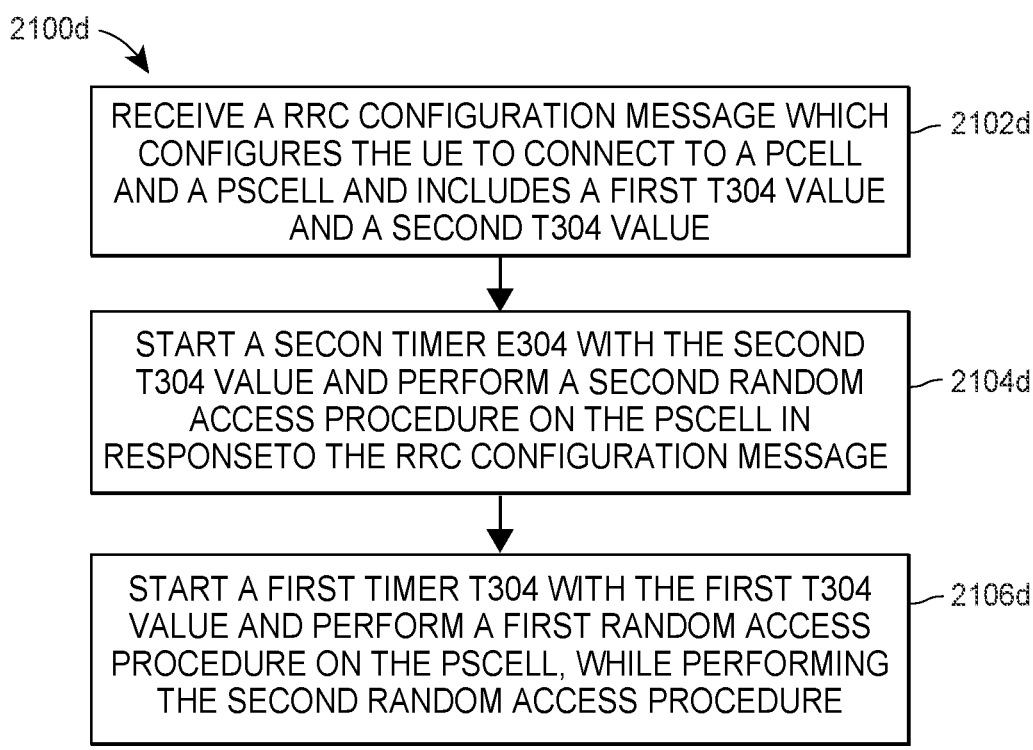
FIG. 21D is yet another flow diagram of an example method for handling a handover-related timer during a handover procedure, which can be implemented in the UE of FIG. 1.

FIG. 21D is a flow diagram depicting yet another example method 2100d implemented in a UE (e.g., MN 102) for handling a handover procedure (or called reconfiguration with sync procedure). For convenience, the method 2100d is discussed below with reference to the MN 104, the SN 106B and the UE 102, operating in the wireless communication system 100.

At block 2102d, the UE 102 receives an RRC reconfiguration message which configures the UE to connect to a PCell and a PSCell and includes a first T304 timer value (e.g., for a first timer T304 for MCG) and a second T304 timer value (e.g., for a second timer T304 for SCG).

In response to the RRC reconfiguration message, the UE 102 starts 2104d a second timer T304 with the second T304 timer value and performs a second random access procedure on the PSCell. At block 2106d, the UE 102 starts a first timer T304 with the first T304 timer value and performs a second random access procedure on the PCell while performing the second random access procedure.

Figure 22:
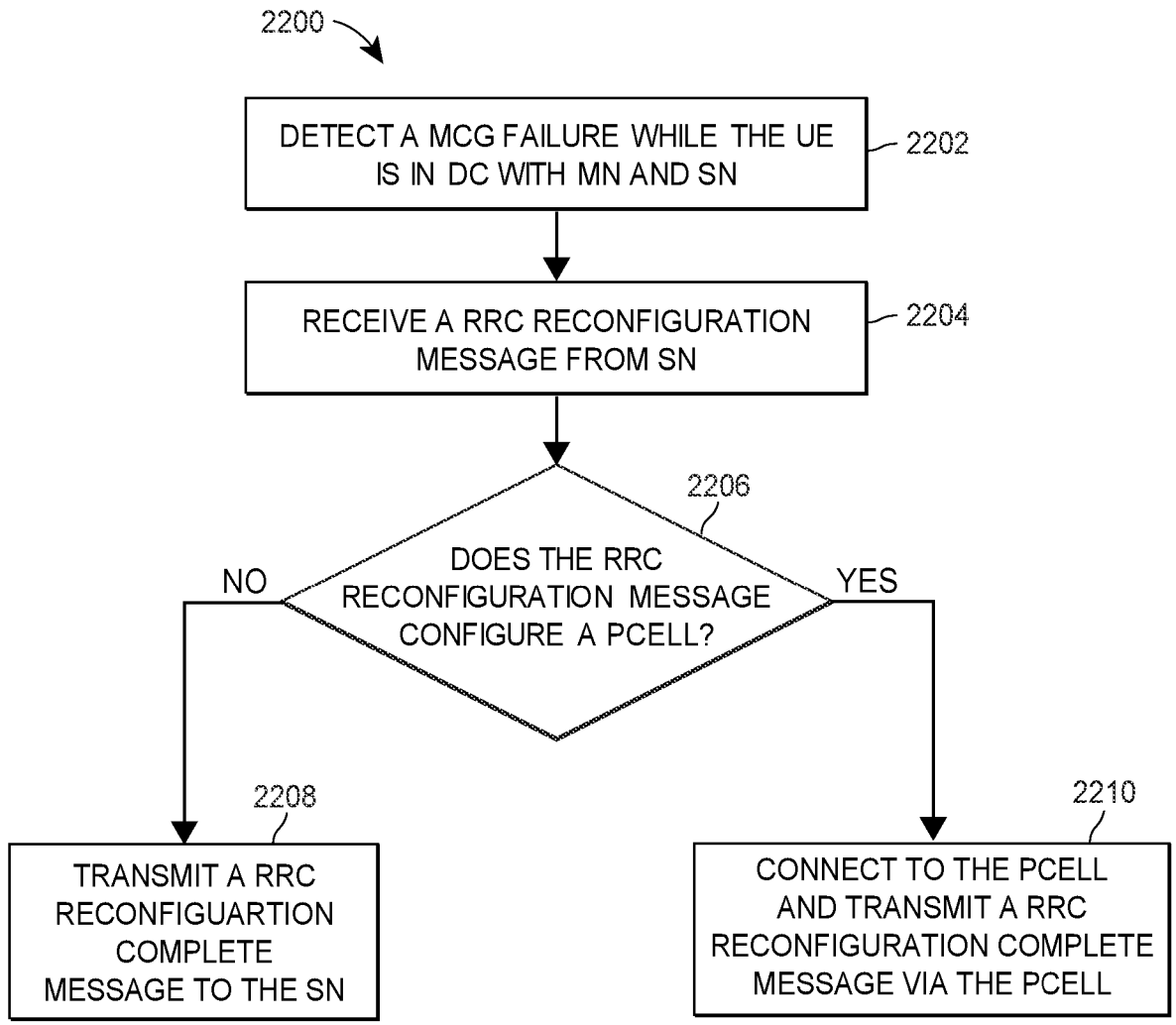
FIG. 22 is a flow diagram of an example method for handling an RRC reconfiguration message, which can be implemented in the UE of FIG. 1.

FIG. 22 is a flow diagram depicting an example method 2200 implemented in a UE (e.g., UE 102) for handling an RRC reconfiguration message. For convenience, the method 2200 is discussed below with reference to the MN 104, the SN 106B and the UE 102, operating in the wireless communication system 100.

At block 2202, the UE 102 in DC with the MN 104 and the SN 106B detects an MCG failure. At block 2204, the UE 102 receives an RRC reconfiguration message from SN 106B after the UE 102 detects the MCG failure. At block 2206, the UE 102 determines whether the RRC reconfiguration message configures a PCell (i.e., request UE to perform handover or reconfiguration with sync).

Figure 23:
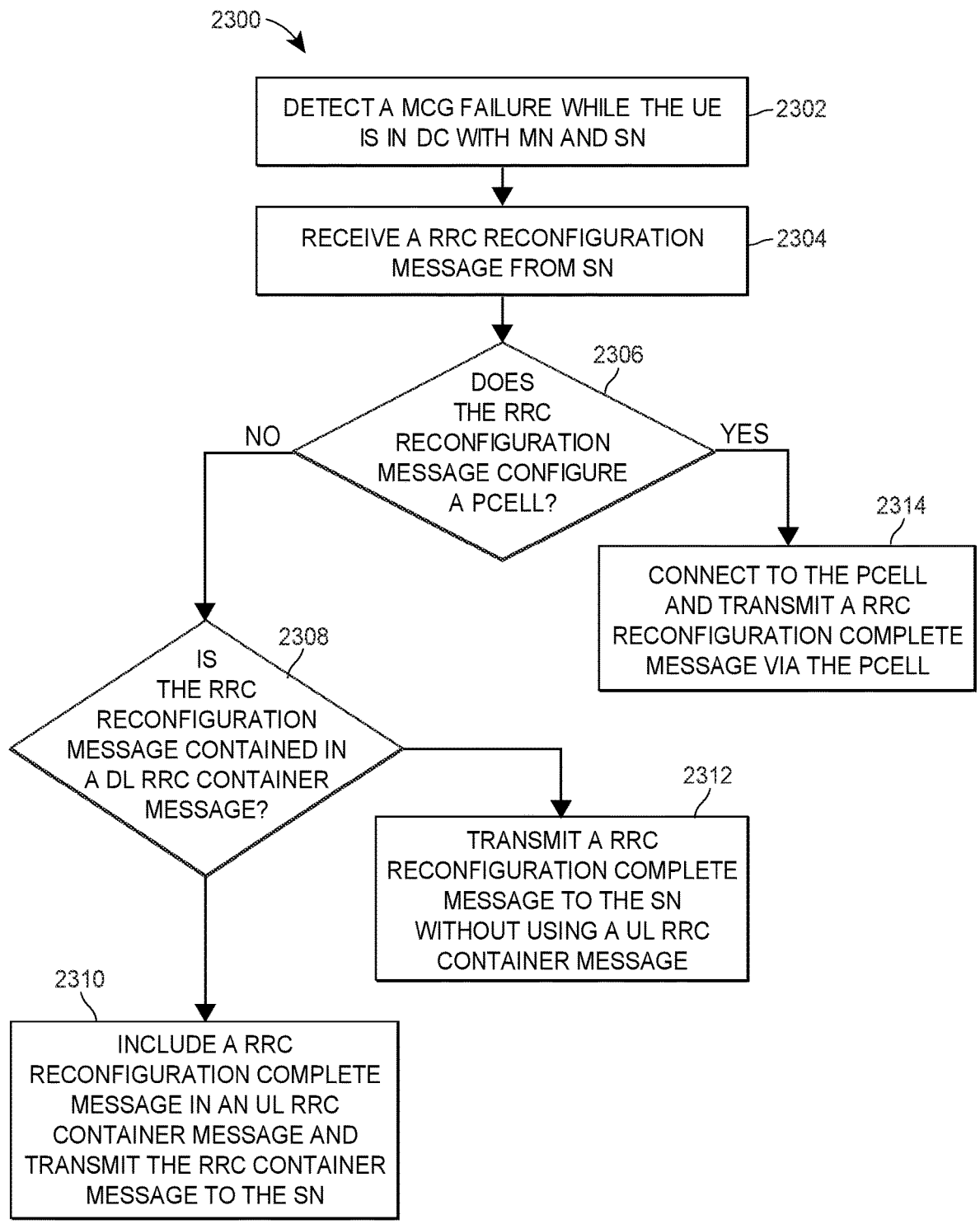
FIG. 23 is a flow diagram of an example method for handling an RRC reconfiguration message, which can be implemented in the UE of FIG. 1.

If the RRC reconfiguration message does not configure a PCell, the UE 102 transmits 2208 an RRC reconfiguration complete message to the SN 106B. If the RRC reconfiguration message configures a PCell, the UE 102 connects 2210 to the PCell (e.g., performs a random access procedure on the PCell) and transmits an RRC reconfiguration complete message via the PCell FIG. 23 is a flow diagram depicting another example method 2300 implemented in a UE (e.g., UE 102) for handling an RRC reconfiguration message. For convenience, the method 2300 is discussed below with reference to the MN 104, the SN 106B and the UE 102, operating in the wireless communication system 100.

At block 2302, the UE 102 in DC with the MN 104 and the SN 106B detects an MCG failure. At block 2304, the UE 102 receives an RRC reconfiguration message from SN 106B after the UE 102 detects the MCG failure. At block 2306, the UE 102 determines whether the RRC reconfiguration message configures a PCell (i.e., requests UE 102 to perform the handover).

If the RRC reconfiguration message does not configure a PCell, the UE 102 determines 2308 whether the RRC reconfiguration message is contained in a DL RRC container message. In one implementation, the DL RRC container message can be a DLInformationTransferMRDC message. If the RRC reconfiguration message is contained in the DL RRC container message, the UE 102 includes 2310 an RRC reconfiguration complete message in a UL RRC container message and transmits the UL RRC container message to the SN. In one implementation, the UL RRC container message is a ULInformationTransferMRDC message. If the RRC reconfiguration message is not contained in the DL RRC container message, the UE 102 transmits 2312 an RRC reconfiguration complete message to the SN 106B without using the UL RRC container message.

If the RRC reconfiguration message configures a PCell, the UE 102 connects 2314 to the PCell (e.g., performs a random access procedure with the PCell) and transmits an RRC reconfiguration complete message via the PCell without using the UL RRC container message.

Figure 24:
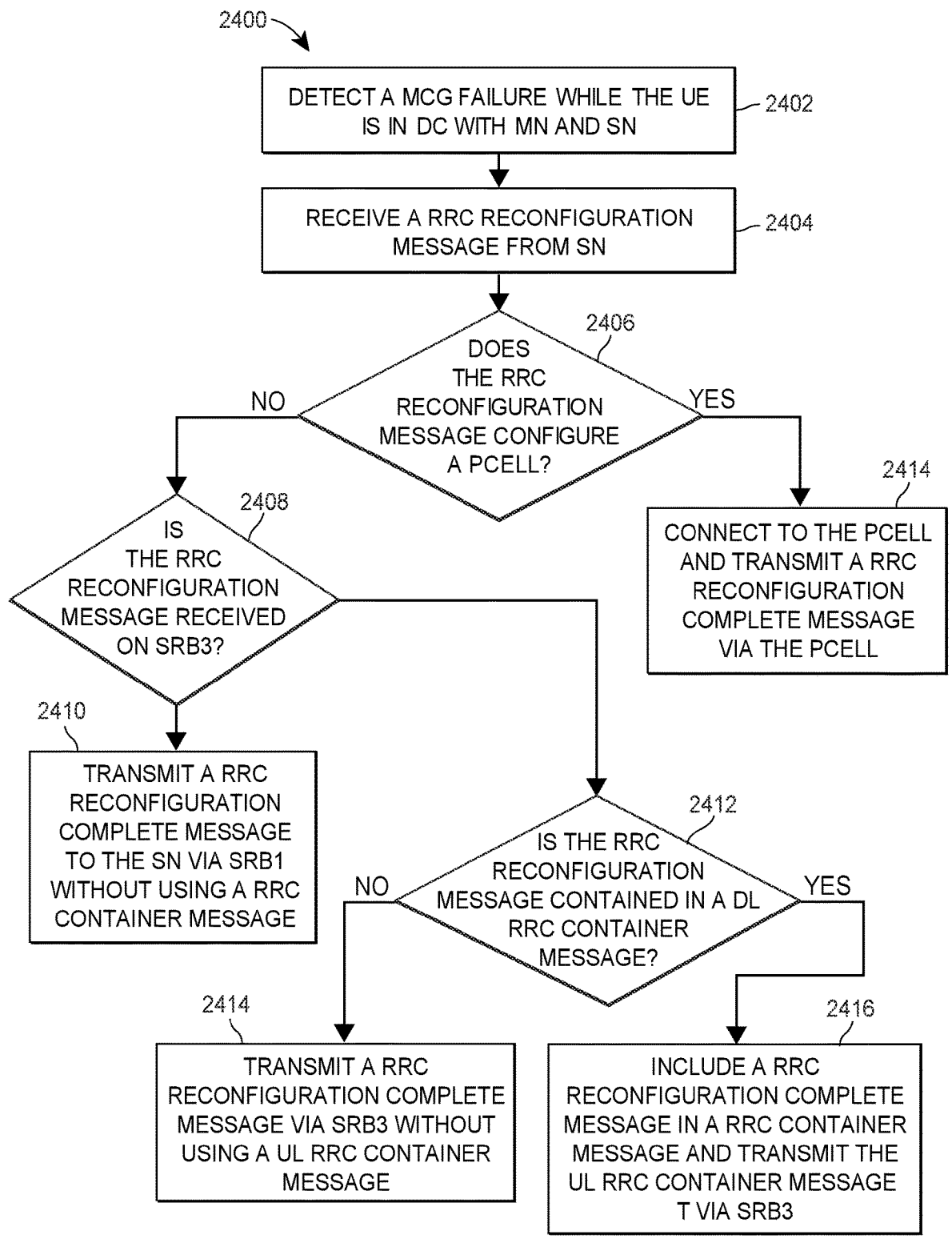
FIG. 24 is a flow diagram of an example method for handling an RRC reconfiguration message, which can be implemented in the UE of FIG. 1.

FIG. 24 is a flow diagram depicting yet another example method 2400 implemented in a UE (e.g., UE 102) for handling an RRC reconfiguration message. For convenience, the method 2400 is discussed below with reference to the MN 104, the SN 106B and the UE 102, operating in the wireless communication system 100.

At block 2402, the UE 102 in DC with the MN 104 and the SN 106B detects MCG failure. At block 2404, the UE 102 receives an RRC reconfiguration message from SN 106B after the UE 102 detects the MCG failure. At block 2406, the UE 102 determines whether the RRC reconfiguration message configures a PCell (i.e., requests UE to perform handover or reconfiguration with sync).

If the RRC reconfiguration message does not configure a PCell, the UE 102 determines 2408 whether the RRC reconfiguration message is received on the SRB3. If the RRC reconfiguration message is not received on the SRB3, the UE 102 transmits 2410 an RRC reconfiguration complete message to the SN via the SRB1 without using an RRC container message. If the RRC reconfiguration message is received on the SRB3, the UE 102 determines 2412 whether the RRC reconfiguration message is contained in a DL RRC container message. In one implementation, the DL RRC container message can be a DLInformationTransferMRDC message. If the RRC reconfiguration message is not contained in the DL RRC container message, the UE 102 transmits 2414 an RRC reconfiguration complete message via the SRB3 without using a UL RRC container message. In one implementation, UL RRC container message can be an ULInformationTransferMRDC message. If the RRC reconfiguration message is contained in the DL RRC container message, the UE 102 includes 2416 an RRC reconfiguration complete message in the UL RRC container message and transmits the RRC container message via the SRB3.

If the RRC reconfiguration message configures a PCell, the UE 102 connects 2414 to the PCell and transmits an RRC reconfiguration complete message via the PCell without using the UL RRC container message. In some implementations, the UE 102 performs a random access procedure on the PCell to connect to the PCell. The UE 102 may transmit the RRC reconfiguration complete message in the random access procedure or after the random access procedure.

The following additional considerations apply to the foregoing discussion.

In some implementations, the RRC reconfiguration message can be a RRCReconfiguration message and the RRC reconfiguration complete message can be a RRCReconfigurationComplete message. In other implementations, the RRC reconfiguration message can be a RRCConnectionReconfiguration message and the RRC reconfiguration complete message can be a RRCConnectionReconfigurationComplete message.

In some implementations, the RRC reconfiguration message can be generated by the MN 104 or the new MN. In other implementations, the RRC reconfiguration can be generated by the SN 106B or the SN 106A.

In some implementations, the handover command may include an RRC reconfiguration message configuring the PSCell and the second T304 timer value and the handover complete message can include an RRC reconfiguration complete message. In the case of NR-NR DC, the handover command and the RRC reconfiguration message can be RRCReconfiguration messages, and the handover complete message and the RRC reconfiguration complete message can be an RRCReconfigurationComplete messages. In the case of NE-DC, the handover command can be an RRCReconfiguration message and the RRC reconfiguration message can be an RRCConnectionReconfiguration message, and the handover complete message can be an RRCReconfigurationComplete message and the RRC reconfiguration complete message can be an RRCConnectionReconfigurationComplete message. In the case of (NG)EN-DC, the handover command can be a RRCConnectionReconfiguration message and the RRC reconfiguration message can be RRCReconfiguration message, and the handover complete message can be an RRCConnectionReconfigurationComplete message and the RRC reconfiguration complete message can be an RRCReconfigurationComplete message. In other implementations, the handover command may not include an RRC reconfiguration message configuring the PSCell and the second T304 timer value, and the handover complete does not include an RRC reconfiguration complete message.

In some implementations, the UE 102 may include a cause of the failure in the MCG failure indication message. If the MCG failure is a radio link failure, the UE 102 indicates a radio link failure as the failure cause. If the MCG failure is an integrity check failure, the UE 102 indicates integrity check failure as the failure cause. If the MCG failure is a handover failure, the UE 102 indicates a handover failure as the failure cause. If the MCG failure is a reconfiguration failure, the UE 102 indicates a reconfiguration failure as the failure cause. If the MCG failure is a reconfiguration with sync failure, the UE 102 indicates reconfiguration with sync failure or handover failure as the failure cause.

In some implementations, the UE 102 may include one or more measurement results associated with one or more different cells in the MCGFailureInformation message. In one implementation, the MN 104 may generate the MCG failure recovery message according to the one or more measurement results. The MN 104 configures a target cell (i.e., target PCell) in the MCG failure recovery message. The target cell is associated with one or more particular measurement results in the MCGFailureInformation message. The MN 104 may include the one or more configurations for the UE 102 to perform the random access procedure on the target cell in the MCG failure recovery message. In response to the MCG failure recovery message, the UE 102 performs a random access procedure via the target cell according to the one or more configurations. In another implementation, the MN 104 may determine a target cell according to one or some of the measurement result(s). For example, the one or some of the measurement result(s) of the target cell indicate the target cell has good signal strength/quality for the UE 102. Then the MN 104 may send a new MN (not shown in FIG. 1) a Handover Request message indicating the target cell (i.e. target PCell). The new MN generates the MCG failure recovery message and includes the MCG failure recovery message in a Handover Request Acknowledge message. The new MN may include the one or more configurations for the UE 102 to perform the random access procedure on the target cell in the MCG failure indication message. In response to the MCG recovery message, the UE 102 performs the random access procedure via the target cell according to the one or more configurations. Then the new MN sends the Handover Request Acknowledge message to the MN 104. Finally, the MN 104 extracts the MCG failure recovery message from the Handover Request Acknowledge message and transmits the MCG failure recovery message to the UE 102 via the SN 106B.

In some implementations, the one or more configurations for the UE 102 to perform the random access procedure may configure a 2-step random access procedure. In another implementations, the random access configuration may configure a 4-step random access procedure. In yet another implementations, the random access configuration may configure a contention-base random access procedure or a contention-free random access procedure. The UE 102 may transmit the MCG failure recovery response message to the cell in the random access procedure or after successfully completing the random access procedure. The cell can be the same as or different from a cell where the UE detects the MCG failure.

In some implementations, the RRC re-establishment request is a RRCConnectionReestablishmentRequest message or a RRCReestablishmentRequest message. The RRC re-establishment is a RRCConnectionReestablishment message or a RRCReestablishment message. The UE may transmit an RRC re-establishment complete message to the MN or the new MN in response to an RRC re-establishment message. The RRC re-establishment complete is a RRCConnectionReestablishmentComplete message or a RRCReestablishmentComplete message.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Embodiments of the techniques described in the present disclosure may include any number of the following aspects, either alone or combination:

1. A method for failure recovery in a user equipment (UE) communicating in dual connectivity (DC) with a master node (MN) and a secondary node (SN), the method comprising: detecting, by processing hardware in a UE communicating in DC with an MN and an SN, a master cell group (MCG) radio link failure associated with the MN; transmitting, by the processing hardware, an MCG failure information message to the SN in response to the MCG radio link failure; receiving, by the processing hardware, an MCG failure recovery message from the SN; transmitting, by the processing hardware, an MCG failure recovery complete message to the MN; detecting, by processing hardware, expiry of a timer, an integrity check failure or reconfiguration failure; and transmitting, by the processing hardware, a radio connection re-establishment request message to the MN in response to the expiry of the timer, the integrity check failure, or the reconfiguration failure.

2. The method according to aspect 1, further comprising: obtaining, by the processing hardware, an indication of a maximum transmit power for communicating with a secondary cell group (SCG) associated with the SN; and in response to detecting the MCG radio link failure, transmitting, to the SN with a power output that exceeds the maximum transmit power for communicating with the SCG, the MCG failure information message.

3. The method according to any of the preceding aspects, further comprising: receiving, by the processing hardware from the SN, an MCG recovery message; and in response to receiving the MCG recovery message, adjusting, by the processing hardware, the power output for subsequent communications with the SCG not to exceed the maximum transmit power.

4. The method according to any of the preceding aspects, wherein detecting the expiry of the timer is for the expiry of the timer for a handover and includes: receiving, by the processing hardware from the MN, a handover command; starting, by the processing hardware, a timer for configuring a maximum amount of time in which to perform a random access procedure with the MN; performing, by the processing hardware, the random access procedure with the MN; and detecting, by the processing hardware, the handover failure in response to the timer expiring before the random access procedure has been completed.

5. The method according to any of the preceding aspects, wherein transmitting the radio connection re-establishment request message to the MN includes transmitting the radio connection re-establishment request message in response to determining that the timer expired before the random access procedure has been completed.

6. The method according to any of the preceding aspects, further comprising: receiving, by the processing hardware from the MN, a handover command including a first time value for a first timer for performing a first random access procedure with the MN and a second time value for a second timer for performing a second random access procedure with the SN; starting, by the processing hardware, the first timer and the second timer; performing, by the processing hardware, the first random access procedure with the MN; detecting, by the processing hardware, the handover failure in response to the first timer expiring before the random access procedure has been completed; performing, by the processing hardware, the second random access procedure with the SN; stopping, by the processing hardware, the second timer in response to completing the second random access procedure; and transmitting the radio connection re-establishment request message to the MN in response to determining that the first timer expired before the first random access procedure has been completed.

7. The method according to any of the preceding aspects, wherein the second time value is longer than the first time value.

8. The method according to any of the preceding aspects, wherein starting the first timer and the second timer includes: starting, by the processing hardware, the first timer and the second timer simultaneously; and performing, by the processing hardware, the first random access procedure and the second random access procedure simultaneously.

9. The method according to any of the preceding aspects, wherein starting the first timer and the second timer includes: starting, by the processing hardware, the second timer upon completion of the first random access procedure or the first timer expiring.

10. The method according to any of the preceding aspects, wherein detecting the integrity check failure or reconfiguration failure includes detecting the integrity check failure or the reconfiguration failure in response to a Radio Resource Control (RRC) message from the MN.

11. The method according to any of the preceding aspects, wherein the radio connection re-establishment request message is transmitted in response to detecting the integrity check failure or the reconfiguration failure.

12. A method for failure recovery in a user equipment (UE) communicating in dual connectivity (DC) with a master node (MN) and a secondary node (SN), the method comprising: receiving, by processing hardware in a UE communicating in DC with an MN and an SN, a handover command from the MN including a first time value for a first timer for performing a first random access procedure with the MN and a second time value for a second timer for performing a second random access procedure with the SN; starting, by the processing hardware, the first timer and the second timer; performing, by the processing hardware, the first random access procedure with the MN; stopping, by the processing hardware, the first timer in response to completing the first random access procedure; performing, by the processing hardware, the second random access procedure with the SN; and stopping, by the processing hardware, the second timer in response to completing the second random access procedure, wherein the first timer and the second timer are configured to prevent the second timer from expiring before completion of the second random access procedure.

13. The method according to aspect 12, wherein the second time value is longer than the first time value, starting the first timer and the second timer includes starting the first timer and the second timer simultaneously, and the second random access procedure is performed upon completion of the first random access procedure.

14. The method according to either aspect 12 or aspect 13, wherein starting the first timer and the second timer includes starting the first timer and the second timer simultaneously, and the first random access procedure and the second random access procedure are performed simultaneously.

15. The method according to any of aspects 12-14, wherein starting the first timer and the second timer includes starting the second timer upon completion of the first random access procedure or expiration of the first timer.

16. A method for failure recovery in a user equipment (UE) communicating in dual connectivity (DC) with a master node (MN) and a secondary node (SN), the method comprising: detecting, by processing hardware in a UE communicating in DC with an MN and an SN, a master cell group (MCG) failure associated with the MN; transmitting, by the processing hardware, an MCG failure information message to the SN; receiving, by the processing hardware, a Radio Resource Control (RRC) reconfiguration message from the SN; determining, by the processing hardware, whether the RRC reconfiguration message configures a cell associated with the MN for connecting with the UE; and in response to determining that the RRC reconfiguration message does not include the cell associated with the MN, transmitting, by the processing hardware, an RRC reconfiguration complete message to the SN.

17. The method of aspect 16, wherein detecting the MCG failure includes at least one of: detecting an MCG radio link failure; detecting a handover failure; or detecting an integrity check failure or reconfiguration failure.

18. The method of either aspect 16 or aspect 17, further comprising: in response to determining that the RRC reconfiguration message includes the cell associated with the MN, transmitting, by the processing hardware, an RRC reconfiguration complete message to the MN.

19. The method of any of aspects 16-18, wherein: determining that the RRC reconfiguration message includes the cell associated with the MN includes determining that the RRC reconfiguration message includes a cell associated with a new MN, and transmitting the RRC reconfiguration message to the MN includes transmitting, by the processing hardware, the RRC reconfiguration complete message to the new MN.

20. A user equipment (UE) comprising processing hardware and configured to implement a method according to any of aspects 1-18.

21. A method for failure recovery in a user equipment (UE) communicating in dual connectivity (DC) with a master node (MN) and a secondary node (SN), the method comprising: detecting, by processing hardware in a UE communicating in DC with an MN and an SN, a master cell group (MCG) failure associated with the MN; in response to detecting the MCG failure, attempting to transmit, by the processing hardware, an MCG failure information message to the SN; and in response to failing to transmit the MCG failure information message to the SN: disconnecting from the SN by the processing hardware; and transmitting, by the processing hardware, a radio connection re-establishment request to the MN in response to the MCG failure.

22. The method according to aspect 21, wherein detecting the MCG failure includes at least one of: detecting an MCG radio link failure; detecting a handover failure; or detecting an integrity check failure or reconfiguration failure.

23. The method according to either aspect 21 or aspect 22, further comprising: obtaining, by the processing hardware, an indication of a maximum transmit power for communicating with a secondary cell group (SCG) associated with the SN; and in response to detecting the MCG radio link failure, transmitting, to the SN with a power output that does not exceed the maximum transmit power for communicating with the SCG, the MCG failure information message.

24. The method according to any of aspects 21-23, further comprising: performing, by the processing hardware, a radio connection re-establishment procedure with the MN; and performing, by the processing hardware, a radio connection reconfiguration procedure and measurement reporting procedures with the MN to reconfigure the UE in DC with the MN and the SN.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method for failure recovery in a user equipment (UE) communicating in dual connectivity (DC) with a master node (MN) and a secondary node (SN), the method comprising:
   receiving, by a UE communicating in DC with an MN and an SN, a handover command directly from the MN including a first time value for a first timer for performing a first random access procedure with the MN and a second time value for a second timer for performing a second random access procedure with the SN, and including a configuration message which configures [d] the UE to connect to a primary cell (PCell) in the MN and a primary second cell (PSCell) in the SN;
   starting, by the UE, the first timer and the second timer;
   performing, by the UE, the first random access procedure with the PCell in the MN;
   performing, by the UE, the second random access procedure with the PSCell in the SN;
   stopping, by the UE, the second timer in response to completing the second random access procedure; and
   in response to the first timer expiring before completing the first random access procedure, transmitting, by the UE, a radio resource control (RRC) re-establishment request message to the MN after stopping the second timer in response to completing the second random access procedure.

2. The method of claim 1, wherein the first timer expires before completing the first random access procedure in a first instance, and further comprising:
   in a second instance:
   wherein the second time value is longer than the first time value, starting the first timer and the second timer includes starting the first timer and the second timer simultaneously, and the second random access procedure is performed upon completion of the first random access procedure.

3. The method of claim 1, wherein starting the first timer and the second timer includes starting the first timer and the second timer simultaneously, and the first random access procedure and the second random access procedure are performed simultaneously.

4. The method of claim 1, wherein starting the first timer and the second timer includes starting the second timer upon expiration of the first timer.

5. The method of claim 1, wherein the first timer expires before completing the first random access procedure in a first instance, and further comprising:
   in a second instance:
   transmitting, by the UE, a handover complete message to the MN upon completing the first random access procedure.

6. The method of claim 1, wherein the second timer is stopped in response to completing the second random access procedure in a first instance, and further comprising:
   in a second instance:
   in response to the second timer expiring before completing the second random access procedure, disconnecting, by the UE from the SN; and
   transmitting, by the UE, a secondary cell group (SCG) failure information message to the MN.

7. The method of claim 6, further comprising:
   in response to transmitting the SCG failure information message, performing, by the UE, reconfiguration procedures to configure the UE in DC with the MN and the SN or another SN.

8. A user equipment (UE) communicating in dual connectivity (DC) with a master node (MN) and a secondary node, the UE comprising processing hardware and configured to:
   receive a handover command directly from the MN including a first time value for a first timer for performing a first random access procedure with the MN and a second time value for a second timer for performing a second random access procedure with the SN, and including a configuration message which configures the UE to connect to a primary cell (PCell) in the MN and a primary secondary cell (PSCell) in the SN;
   start the first timer and the second timer;
   perform the first random access procedure with the PCell in the MN;

perform the second random access procedure with the PSCell in the SN; and stop the second timer in response to completing the second random access procedure; and in response to the first timer expiring before completing the first random access procedure, transmit a radio resource control (RRC) re-establishment request message to the MN after stopping the second timer in response to completing the second random access procedure.

9. The UE of claim 8, wherein the first timer expires before completing the first random access procedure in a first instance, and the processing hardware is further configured to:

in a second instance:

wherein the second time value is longer than the first time value, the first timer and the second timer are started simultaneously, and the second random access procedure is performed upon completion of the first random access procedure.

10. The UE of claim 8, wherein the first timer and the second timer are started simultaneously, and the first random access procedure and the second random access procedure are performed simultaneously.

11. The UE of claim 8, wherein the second timer is started upon expiration of the first timer.

12. The UE of claim 8, wherein the first timer expires before completing the first random access procedure in a first instance, and in a second instance the processing hardware is further configured to:

transmit a handover complete message to the MN upon completing the first random access procedure.

13. The UE of claim 8, wherein the second timer is stopped in response to completing the second random access procedure in a first instance, and the processing hardware is further configured to:

in a second instance:

in response to the second timer expiring before completing the second random access procedure, disconnect from the SN; and transmit a secondary cell group (SCG) failure information message to the MN.

14. The UE of claim 13, wherein the processing hardware is further configured to:

in response to transmitting the SCG failure information message, perform reconfiguration procedures to configure the UE in DC with the MN and the SN or another SN.

* * * * *